(12) United States Patent
Shimomura et al.

(10) Patent No.: US 11,334,317 B2
(45) Date of Patent: May 17, 2022

(54) INFORMATION PROCESSING APPARATUS, PROGRAM, AND INFORMATION PROCESSING METHOD CONFIGURED TO HANDLE A HIGH-PRECISION COMPUTER NUMBER

(71) Applicant: CORE CONCEPT TECHNOLOGIES INC., Tokyo (JP)

(72) Inventors: Katsunori Shimomura, Tokyo (JP); Tadaaki Taguchi, Tokyo (JP); Akira Kawasaki, Tokyo (JP); Reki Yamamoto, Tokyo (JP)

(73) Assignee: CORE CONCEPT TECHNOLOGIES INC., Tokyo (JP)

( * ) Notice: Subject to any disclaimer, the term of this patent is extended or adjusted under 35 U.S.C. 154(b) by 0 days.

(21) Appl. No.: 17/056,367

(22) PCT Filed: Jun. 19, 2020

(86) PCT No.: PCT/JP2020/024260
§ 371 (c)(1),
(2) Date: Nov. 17, 2020

(87) PCT Pub. No.: WO2021/106253
PCT Pub. Date: Jun. 3, 2021

(65) Prior Publication Data
US 2021/0247960 A1 Aug. 12, 2021

(30) Foreign Application Priority Data
Nov. 27, 2019 (JP) .............................. JP2019-214678

(51) Int. Cl.
*G06F 7/485* (2006.01)
*G06F 7/487* (2006.01)
*G06F 7/499* (2006.01)

(52) U.S. Cl.
CPC ............ *G06F 7/485* (2013.01); *G06F 7/4876* (2013.01); *G06F 7/49989* (2013.01)

(58) Field of Classification Search
CPC . G06F 17/10; G06F 17/18; G06F 7/38; G06F 7/483; G06F 7/485–4876;
(Continued)

(56) References Cited

U.S. PATENT DOCUMENTS

2002/0019975 A1\* 2/2002 Johnson .................... G06N 5/04
717/117
2014/0074902 A1\* 3/2014 Naeimi .................... G06F 7/483
708/495

FOREIGN PATENT DOCUMENTS

JP    2004-005395 A    1/2004
JP    2006-323710 A    11/2006
(Continued)

OTHER PUBLICATIONS

Jul. 28, 2020 Written Opinion of the International Searching Authority issued in International Patent Application No. PCT/JP2020/024260.

*Primary Examiner* — Matthew D Sandifer
(74) *Attorney, Agent, or Firm* — Oliff PLC

(57) ABSTRACT

An information processing apparatus, program, and information processing method performing validated numerics. Arithmetic operation of definite numbers $a_1$ and $b_1$ of the computer numbers in which real numbers A and B are defined by formulas (1) and (2) is performed to determine an absolute effective digit γ satisfying formula (3), $$A = a_1 + a_2, |a_1| \leq C^{ha}, -C^{ea} \leq a_2 < C^{ea} \quad \text{formula (1)},$$

$$B = b_1 + b_2, |a_1| \leq C^{hb}, -C^{eb} \leq b_2 < C^{eb} \quad \text{formula (2)},$$

$$(A,B) = (a,b)_1 + (a,b)_2, -C^{\gamma} \leq (a,b)_2 < C^{\gamma} \quad \text{formula (3)}.$$

(Continued)

$a_1$ and $b_1$ are definite numbers whose numerical values are definite, and $a_2$ and $b_2$ are uncertain numbers whose numerical values are uncertain; C denotes a radix; $h_a$ and $h_b$ denote extended high order maxes that are minimum extended digits satisfying $|a_1| \leq C^{ha}$ and $|b_1| \leq C^{hb}$, and $h_a$ and $h_b$ denote high order maxes that are integers; and $e_a$, $e_b$ and $\gamma$ denote the absolute effective digits that are integers.

11 Claims, 22 Drawing Sheets

(58) Field of Classification Search
CPC .. G06F 7/49989; G06F 7/50; G06F 7/52–523; G06F 7/535; G06F 7/544
See application file for complete search history.

(56) References Cited

FOREIGN PATENT DOCUMENTS

| | | |
|---|---|---|
| JP | 2015-232833 A | 12/2015 |
| JP | 2017-538197 A | 12/2017 |

\* cited by examiner

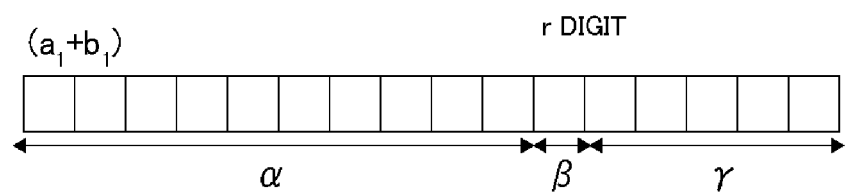
FIG.5
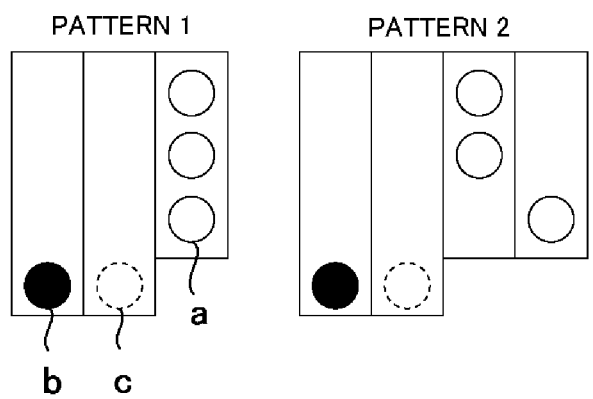
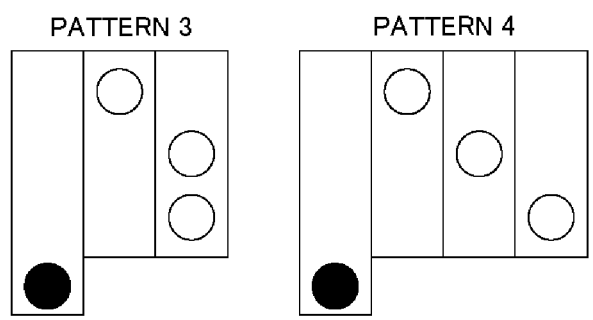
FIG.6

```
typedef struct digital_expression{
Int         s;          // SIGN 1 INDICATES POSITIVE,-1 INDICATES NEGATIVE
float       h;          // VALUE SATISFYING | DEFINETE NUBER | ≤log₂h
Int         l;          // LEAST SIGNIFICANT DIGIT IN BINARY NOTATION OF DEFINITE NUMBER
Int         e;          // ABSOLUTE EFFECTIVE DIGIT
Int         n;          // NUMBER OF UNSIGNED INTEGERS THAT STORE DEFINITE NUMBER
unsigned int *a;        // UNSIGNED INTEGER ARRAY THAT STORES DEFINITE NUMBER
}Digital_expression;
```

FIG.7

```
Void        mult_digital_expression(digital_expression* A, digital_expression* B,
            digital_expression* C);
Void        plus_digital_expression(digital_expression* A, digital_expression* B,
            digital_expression* C);
Void        divide_digital_expression(digital_expression* A, digital_expression* B,
            digital_expression* C);
```

printf("f=%lf¥n", f);

f = a + b * c1 - b*c2 - b*c3 - b*c4 + d + e;
printf("f=%lf¥n", f);

f1 = a + b*c1 + d + e;
f2 = b*c2 + b*c3 + b*c4;
f = f1 - f2;
printf("f1,f2,f->%lf,%lf,%lf¥n", f1, f2, f);
```

FIG.9

```
set_int(77617, &x);// x
set_int(33096, &y);// y
mult_digital_expression(&x, &x, &x2);// x^2
mult_digital_expression(&y, &y, &y2);// y^2
mult_digital_expression(&y2, &y2, &y4);// y^4
mult_digital_expression(&y4, &y2, &y6);// y^6
mult_digital_expression(&y4, &y4, &y8);// y^8
set_double(333.75, &k333_75);// 333.75
mult_digital_expression(&k333_75, &y6, &a);// 333.75*y^6 -> a
copy_digital_expression(&x2, &b);// x^2 -> b
set_double(11.0, &k11);// 11
mult_digital_expression(&x2, &y2, &tmp);// x^2*y^2 -> tmp
mult_digital_expression(&k11, &tmp, &c1);// 11*x^2*y^2 -> c1
clear_digital_expression(&tmp);
copy_digital_expression(&y6, &c2);// y^6 -> c2
set_double(121.0, &k121);// 121
mult_digital_expression(&k121, &y4, &c3);// 121*y^4 -> c3
set_double(2.0, &c4);// 2 -> c4
set_double(5.5, &k5_5);// 5.5
mult_digital_expression(&k5_5, &y8, &d);// 5.5*y^8 -> d
set_int(2, &k2);// 2
mult_digital_expression(&k2, &y, &k2y);// 2*y -> k2y
inverse_digital_expression(&k2y, -200, &k2yinv, &status);// 1/(2*y) -> k2yinv
mult_digital_expression(&x, &k2yinv, &e);// x/(2*y) -> e
mult_digital_expression(&b, &c1, &bc1);// b*c1 -> bc1
plus_digital_expression(&a, &bc1, &abc1);// a + b*c1 -> abc1
plus_digital_expression(&abc1, &d, &abc1d);// a + b*c1 + d -> abc1d
plus_digital_expression(&abc1d, &e, &f1);// a + b*c1 + d + e -> f1
plus_digital_expression(&c2, &c3, &tmp);// c2 + c3 -> tmp
plus_digital_expression(&tmp, &c4, &c2c3c4);// c2 + c3 + c4 -> c2c3c4
mult_digital_expression(&b, &c2c3c4, &f2);// b*(c2 + c3 + c4) -> f2
printf("f1->\n"); print_digital_expression(&f1);
printf("f2->\n"); print_digital_expression(&f2);
f2.s = -1;
plus_digital_expression(&f1, &f2, &f);
printf("f->\n"); print_digital_expression(&f);// f1 - f2 -> f
```

```
typedef struct digital_expression {
Char            s;      // sign(top bit) + n(7-bits)
Short           h;      // high order max 2-digit
unsigned char   hd;     // high order max sub 2-digit -> 2^ (h+hd/2^8)
Short           l;      // low  order min 2-digit -> 2^l
Short           e;      // effective digit 2-digit
unsigned char   ed;     // effective digit sub 2-digit -> 2^ (e+ed/2^8)
unsigned int    *a;     // array -> a[n];  real a-size = (h-l+1+31)/32 => (h-l+32)>>5
}Digital_expression;
```

FIG.18

| α' | β' | γ | γ' | NUMBER OF DIGITS OF DIFFERENCE |
|---|---|---|---|---|
| 0 | 0 | 1 | 0 | 65535 |
| 1 | 0 | 1 | 1 | 10 |
| 1 | 1 | 1 | 1 | 65535 |
| 2 | 0 | 1 | 2 | 9 |
| 2 | 1 | 1 | 2 | 10 |
| 2 | 2 | 1 | 2 | 65535 |
| 3 | 0 | 1 | 2 | 10 |
| 3 | 1 | 1 | 3 | 9 |
| 3 | 2 | 1 | 3 | 10 |
| 3 | 3 | 1 | 3 | 65535 |
| 4 | 0 | 1 | 3 | 9 |
| 4 | 1 | 1 | 3 | 10 |
| 4 | 2 | 1 | 4 | 9 |
| 4 | 3 | 1 | 4 | 10 |
| 4 | 4 | 1 | 4 | 65535 |
| 5 | 0 | 1 | 3 | 10 |
| 5 | 1 | 1 | 4 | 9 |
| 5 | 2 | 1 | 4 | 10 |
| 5 | 3 | 1 | 5 | 9 |

0.1,sign(0), An(2),h(-4),h'(174),I(-55),e(-57),e'(0)
A->a[1]    00000000000011001100110011001100
A->a[0]    11001100110011001100110011001101
.100000000 0000000055 5111512312

FIG.32

1.1,sign(0), An(2),h(0),h'(36),I(-51),e(-53),e'(0)
A->a[1]    00000000000100011001100110011001100
A->a[0]    11001100110011001100110011001101
1.10000000 0000000088 8178419700

FIG.33

1.2,sign(0), An(2), h(0),h'(68),I(-55),e(-53),e'(23),
A->a[1]    00000000100110011001100110011001
A->a[0]    10011001100110011001100110011101
1.20000000 0000000094 3689570931

FIG.34

1.2,sign(0),An(2),h(0),h'(68),I(-50),e(-53),e'(0)
A->a[1]    00000000000100011001100110011001100
A->a[0]    11001100110011001100110011001101
1.20000000 0000000177 6356839400

FIG.35

0.0000001,sign(0), An(2),h(-24),h'(192),l(-73),e(-77),e'(0)
A->a[1]     00000000000001101011010111111110
A->a[0]     01010011010101111001010111101001
.000000099 9999999999 9999547481

FIG.36

1.0,sign(0), An(1),h(0),h'(1),l(0),e(-53),e'(0)
A->a[0]     00000000000000000000000000000001
1.

FIG.37

1.00001,sign(0), An(2), h(0),h'(1),l(-59),e(-53),e'(100)
A->a[1]     00001000000000000000010100111110
A->a[0]     00101101011000100011100011010001
1.00000999 9999999983 9800368661

FIG.38

1.00001,sign(0), An(2)h(0),h'(1),l(-50),e(-53),e'(0)
A->a[1]     00000000000001000000000000000010
A->a[0]     10011111000101101011000100100011
1.00001000 0000005838 6717682878

FIG.39

0.11,sign(0), An(2),h(-4),h'(209),l(-63),e(-56),e'(112)
A->a[1]    00001110000101000111101011100001
A->a[0]    01000111101011100001010100000101
.110000000 0000000149 7500040636

FIG.40

0.11,sign(0), An(2),h(-4),h'(209),l(-55),e(-57),e'(0)
A->a[1]    00000000000111000010100011110100
A->a[0]    11100001010001111010111000010101
.110000000 0000000144 3289932012

FIG.41 times test,sign(0), An(2),h(-2326),h'(202),l(-2386),e(-2372),e'(1)
A->a[1]    00011011100111111010110111011100
A->a[0]    01000011011010101101000110101011
.000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 0000000000 0000000000
0000000000 0000000000 1099999999 9999946165

FIG.42

1/3,sign(0), h(-2),h'(107),l(-98),e(-100),e'(0)
A->a[3]   00000000000000000000000000000001
A->a[2]   01010101010101010101010101010101
A->a[1]   01010101010101010101010101010101
A->a[0]   01010101010101010101010101010101
.333333333 3333333333 3333333333

FIG.43

0.1,sign(0),h(-4),h'(174),l(-55),e(-57),e'(0)
A->a[1]   00000000000011001100110011001100
A->a[0]   11001100110011001100110011001101
.100000000 0000000055 5111512312

FIG.44

1,sign(0),h(0),h'(1),l(0),e(-32768),e'(0)
A->a[0]   00000000000000000000000000000001
1.

FIG.45

1/0.1,sign(0),h(3),h'(83),l(-53),e(-51),e'(169)
A->a[1]   00000001001111111111111111111111
A->a[0]   11111111111111111111111111111011
9.99999999 9999999444 8884876874

FIG.46

0.1,sign(0),h(-4),h'(174),l(-55),e(-57),e'(0)
A->a[1]   00000000000011001100110011001100
A->a[0]   11001100110011001100110011001101
.100000000 0000000055 5111512312

FIG.47

0.2,sign(0),h(-3),h'(174),l(-54),e(-56),e'(0)
A->a[1]   00000000000011001100110011001100
A->a[0]   11001100110011001100110011001101
.200000000 0000000111 0223024625

FIG.48

0.2/0.1,sign(0),h(1),h'(1),l(1),e(-52),e'(86)
A->a[0]   00000000000000000000000000000001
2.

FIG.49

INFORMATION PROCESSING APPARATUS, PROGRAM, AND INFORMATION PROCESSING METHOD CONFIGURED TO HANDLE A HIGH-PRECISION COMPUTER NUMBER

TECHNICAL FIELD

This technology relates to an information processing apparatus, a program, and an information processing method for performing numerical arithmetic operations. This application claims priority on the basis of Japanese Patent Application No. 2019-214678, filed on Nov. 27, 2019, in Japan, which is incorporated by reference herein.

Numerical arithmetic operation is a method for numerically solving a problem which is difficult to solve analytically, and a computer floating-point arithmetic is usually used for the arithmetic operation. The IEEE (Institute of Electrical and Electronic Engineers) 754 is a standard for floating-point arithmetic. At present, most numerical arithmetic operation programs are implemented in accordance with the IEEE 754 standard, and their assets are enormous.

Floating-point arithmetic has several drawbacks, including overflow/underflow, digit loss, information loss, leftover, and round-off error. For this reason, although there has been no major problem even in double precision floating-point arithmetic at the level of there is a concern that the effective digit may be insufficient at the level of nm. Furthermore, it is assumed that arithmetic operation errors are likely to occur if a series of higher order polynomials is handled.

At present, arithmetics considering errors (validated numerics) are known, and there is an arithmetic using a software to perform arithmetic operations while confirming the range of the true solution so as to yield a result guaranteed to be mathematically true for a problem of continuity in mathematics. The validation by this software is intended to deal with the problem of continuous numbers by inserting a true value to be operated into a section both ends of which are floating-point numbers which can be handled by a processor. The four arithmetic operations for handling these intervals in the same way as numbers are called interval arithmetic, and those that perform the interval arithmetic using floating-point numbers are called machine interval arithmetic. However, the interval arithmetic requires a large amount of arithmetic operations and is complicated because it denotes real numbers as ranges and exactly performs the four arithmetic operations on the ranges.

PRIOR ART REFERENCE

Patent Reference

[Patent Reference 1] Japanese Unexamined Patent Application Publication No. 2004-05395

SUMMARY OF THE INVENTION

Problem to be Solved by the Invention

The present technology has been proposed in view of such conventional circumstances, and provides an information processing apparatus, a program, and an information processing method that can easily perform validated numerics.

Means of Solving the Problem

As a result of intensive examination, the present inventors have found that the above problem can be solved by introducing a (high precision) computer number that uses a definite number and an uncertain number separately to expresses a number belonging to a subset of real numbers which can be expressed in n-ary numbers with a radix n.

Specifically, an information processing apparatus according to the present technology includes: an input unit for inputting a high-precision computer number in which real numbers A and B are respectively defined by the following formulas (11) and (12); a storage unit for storing the high-precision computer number; and an arithmetic unit that performs an arithmetic operation by using definite numbers $a_1$ and $b_1$ of the high-precision computer numbers stored in the storage unit, determines an extended absolute effective digit $(\gamma+\gamma')$ so as to satisfy the following formula (13), and storing, in the storage unit, high-precision computer numbers as the result of the arithmetic operation.

Moreover, a program according to the present technology causes a computer to execute a processing including: an input step of inputting a high-precision computer number in which real numbers A and B are respectively defined by the following formulas (11) and (12); a storing step of storing the high-precision computer number in a storage unit; and an arithmetic step of performing an arithmetic operation by using definite numbers $a_1$ and $b_1$ of the high-precision computer number stored in the storage unit, determining an extended absolute effective digit $(\gamma+\gamma')$ so as to satisfy the following formula (13), and storing, in the storage unit, high-precision computer numbers as a result of the arithmetic operation.

Furthermore, an information processing method according to the present technology includes: an input step of inputting a high-precision computer number in which real numbers A and B are respectively defined by the following formulas (11) and (12); a storing step of storing the high-precision computer number in a storage unit; and an arithmetic step of performing an arithmetic operation by using definite numbers $a_1$ and $b_1$ of the high-precision computer number stored in the storage unit, determining an extended absolute effective digit $(\gamma+\gamma')$ so as to satisfy the following formula (13), and storing, in the storage unit, high-precision computer numbers as a result of the arithmetic operation.

$$A=a_1+a_2, |a_1| \leq C^{h_a+h_a'}, -C^{e_a+e_a'} \leq a_2 < C^{e_a+e_a'} \tag{11}$$

$$B=b_1+b_2, |b_1| \leq C^{h_b+h_b'}, -C^{e_b+e_b'} \leq b_2 < C^{e_b+e_b'} \tag{12}$$

$$(A,B)=(a,b)_1+(a,b)_2, -C^{\gamma+\gamma'} \leq (a,b)_2 < C^{\gamma+\gamma'} \tag{13}$$

Herein $a_1$ and $b_1$ are definite numbers whose numerical values are definite, and $a_2$ and $b_2$ are uncertain numbers whose numerical values are uncertain; C denotes a radix; $h_a+h_a'$ and $h_b+h_b'$ respectively denote extended high order maxes that are minimum extended digits satisfying $|a_1| \leq C^{h_a+h_a'}$ and $|b_1| \leq C^{h_b+h_b'}$; $h_a$ and $h_b$ respectively denote high order maxes that are integers; $h_a'$ and $h_b'$ respectively denote decimal digits that are decimals of $0 \leq h_a' < 1$ and $0 \leq h_b' < 1$; $e_a+e_a'$, $e_b$ $e_b'$, and $\gamma+\gamma'$ denote extended absolute effective digits that are extended digits; $e_a$, $e_b$, and $\gamma$ denote absolute effective digits that are integers; ea, $e_b'$, and r' respectively denote decimal digits that are decimals of $0 \leq e_a' < 1$, $0 \leq e_b' < 1$, and $0 \leq r' < 1$; (A, B) is the arithmetic operation result of the real numbers A and B; $(a, b)_1$ is the arithmetic operation result of the definite numbers $a_1$ and $b_1$; and $(a, b)_2$ is the arithmetic operation result of the uncertain numbers $a_2$ and $b_2$.

Advantageous Effects of Invention

According to this technology, it is possible to easily perform validated numerics. While interval arithmetic treats numbers as a range, the computer number is just a kind of number and the uncertain number is not accurately determined and can take any values within the range of absolute effective digit, so that the idea of computer number is different from that of interval arithmetic.

BRIEF DESCRIPTION OF DRAWINGS

FIG. 5 illustrates a case where $(a_1+b_1)=\alpha+\beta+\gamma$.

FIG. 6 illustrates a method for determining the minimum integer r that satisfies $C^{m+\beta}+C^{\alpha+m}+C^{m+n} \leq C^r$.

FIG. 7 illustrates an example of a computer number expressed in C language.

FIG. 8 illustrates an example of forms of multiplication, addition, and division of computer numbers expressed in C language.

FIG. 9 illustrates an example program for computing the Rump formula in C language.

FIG. 10 illustrates an example in which the program example shown in FIG. 9 is converted into a program using computer numbers.

FIG. 11 illustrates an example of a bit representation of the arithmetic operation result of the positive part f1.

FIG. 12 illustrates an example of a bit representation of the arithmetic operation result of the negative part f2.

FIG. 18 illustrates an example of a definition of a high-precision computer number.

FIG. 32 illustrates an example of a bit representation of decimal number "0.1" with a high-precision computer number.

FIG. 33 illustrates an example of a bit representation of decimal number "1.1" with a high-precision computer number.

FIG. 34 illustrates an example of the result of calculating "0.1+1.1" by using high-precision computer numbers after converting decimal numbers "0.1" and "1.1" to high-precision computer numbers.

FIG. 35 illustrates an example of the result of calculating decimal number multiplication "0.1*1.1" in the floating-point format and converting the product to a high-precision computer number.

FIG. 36 illustrates an example of a bit representation of a decimal number "0.0000001" with a high-precision computer number.

FIG. 37 illustrates an example of a bit representation of a decimal number "1.0" with a high-precision computer number.

FIG. 38 illustrates an example of the result of converting decimal numbers "0.0000001" and "1.0" into high-precision computer numbers and then adding "0.0000001" one hundred times to "1.0" by using high-precision computer numbers.

FIG. 39 illustrates an example of the result of adding "0.0000001" one hundred times to "1.0" in the floating-point format and converting the result into a high-precision computer number.

FIG. 40 illustrates an example of the result of converting decimal numbers "0.1" and "1.1" to high-precision computer numbers and calculating "0.1*1.1" by using high-precision computer numbers.

FIG. 41 illustrates an example of the result of calculating decimal number multiplication "0.1*1.1" in the floating-point format and converting the product to a high-precision computer number.

FIG. 42 illustrates an example of the result of multiplication in which "1.1" is multiplied by "0.0000001" one hundred times with high-precision computer numbers.

FIG. 43 illustrates an example of the result of converting decimal numbers "1" and "3" to high-precision computer numbers and then using high-precision computer numbers to calculate "1/3".

FIG. 44 illustrates an example of a bit representation of a denominator of decimal number "0.1" with a high-precision computer number.

FIG. 45 illustrates an example of a bit representation of a numerator of decimal number "1" with a high-precision computer number.

FIG. 46 illustrates an example of the result of calculating "1/0.1" by using high-precision computer numbers.

FIG. 47 illustrates an example of a bit representation of a denominator of decimal number "0.1" with a high-precision computer number.

FIG. 48 illustrates an example of a bit representation of a numerator of decimal number "0.2" with a high-precision computer number.

FIG. 49 illustrates an example of the result of calculating "0.2/0.1" by using high-precision computer numbers.

MODE FOR CARRYING OUT THE INVENTION

1. First Embodiment

Figure 1:
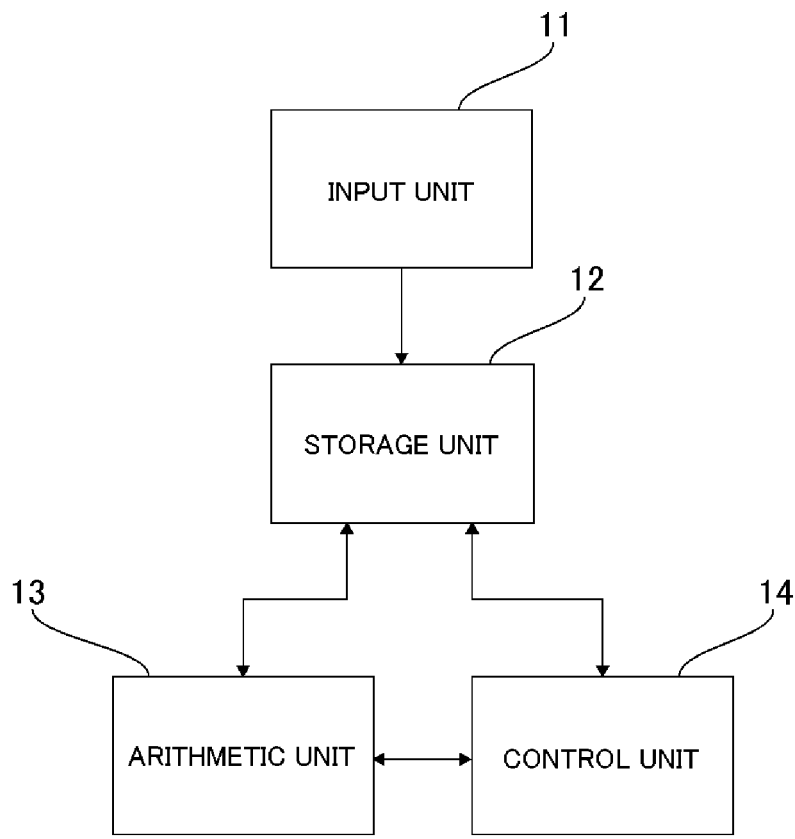
FIG. 1 is a block diagram illustrating a functional configuration of an information processing apparatus according to the present technology.

Hereinafter, a first embodiment of the present technology will be described in detail in the following order with reference to the drawings. It should be noted that the present technology is not limited to the following embodiment, and various modifications may be made without departing from the scope of the present technology.
1-1. Information processing apparatus
1-2. Arithmetic operation of computer numbers
1-3. Examples 1-1. Information Processing Apparatus Functional Configuration FIG. 1 is a block diagram illustrating a functional configuration of an information processing apparatus according to the present technology. As shown in FIG. 1, an information processing apparatus is provided with an input unit 11 for inputting a computer number in which real numbers A and B are respectively defined by the following formulas (1) and (2); a storage unit 12 for storing the computer number; and an arithmetic unit 13 that performs an arithmetic operation by using definite numbers $a_1$ and $b_1$ of the high-precision computer number stored in the storage unit 12, determines an extended absolute effective digit γ so as to satisfy the following formula (3), and storing, in the storage unit 12, high-precision computer number as the result of the arithmetic operation.

$$A = a_1 + a_2, |a_1| \leq C^{ha}, -C^{ea} \leq a_2 < C^{ea} \quad (1)$$

$$A = b_1 + b_2, |b_1| \leq C^{hb}, -C^{eb} \leq b_2 < C^{eb} \quad (2)$$

$$(A,B) = (a,b)_1 + (a,b)_2, -C^{\gamma} \leq (a,b)_2 < C^{\gamma} \quad (3)$$

Herein $a_1$ and $b_1$ are definite numbers whose numerical values are definite, and $a_2$ and $b_2$ are uncertain numbers whose numerical values are uncertain; C denotes a radix; $h_a$ and $h_b$ respectively denote extended high order maxes that are minimum extended digits satisfying $|a_1| \leq C^{ha}$ and $|b_1| \leq C^{hb}$, and $h_a$ and $h_b$ respectively denote high order maxes that are integers; $e_a$, $e_b$ and γ denote absolute effective digits that are integers; and (A, B) is an arithmetic operation result of the real numbers A and B, $(a, b)_1$ is an arithmetic operation result of the definite numbers $a_1$ and $b_1$, and $(a, b)_2$ is an arithmetic operation result of the uncertain numbers $a_2$ and $b_2$.

The radix C of the computer number is not particularly limited, but is preferably 2, 8, or 16. Thus, it is possible to verify the arithmetic operation of binary, octal or hexadecimal numbers used in general-purpose computers.

Figure 2:
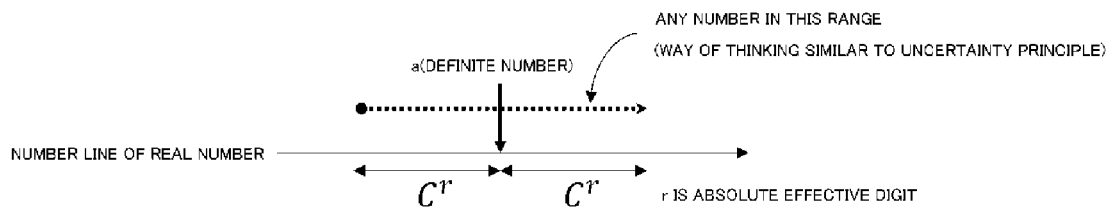
FIG. 2 illustrates a relation between a real number and a computer number.

FIG. 2 illustrates a relation between a real number and a computer number. As shown in FIG. 2, in the computer number (a+b), the real number A is any number in a range of $a - C^{\gamma} \leq A < a + C^{\gamma}$, which is a way of thinking similar to the uncertainty principle. The definite number a is a numerical value that is valid up to the absolute effective digit (least significant digit), and the numerical value thereof is guaranteed. Herein, the absolute effective digit indicates the reliable digits after the decimal point, and is a value of γ defining the error $C^{\gamma}$. If b=0 (the absolute effective digit m is infinitesimal), then the number is a definite computer number whose numerical value is definite, otherwise the number is uncertain computer number whose numerical value is uncertain. For example, if π or √2 is expanded to an absolute effective digit γ by a radix C, then the numerical value expanded to the absolute effective digit γ is the definite number a, and the numerical value r thereafter is the uncertain number b.

The input unit 11 inputs computer numbers in which real numbers A and B are respectively defined by the following formulas (1) and (2).

$$A = a_1 + a_2, |a_1| \leq C^{ha}, -C^{ea} \leq a_2 < C^{ea} \quad (1)$$

$$A = b_1 + b_2, |b_1| \leq C^{hb}, -C^{eb} \leq b_2 < C^{eb} \quad (2)$$

Herein $a_1$ and $b_1$ are definite numbers whose numerical values are definite, and $a_2$ and $b_2$ are uncertain numbers whose numerical values are uncertain; C denotes a radix; $h_a$ and $h_b$ respectively denote extended high order maxes that are minimum extended digits satisfying $|a_1| \leq C^{ha}$ and $|b_1| \leq C^{hb}$, and $h_a$ and $h_b$ respectively denote high order maxes that are integers; and $e_a$, $e_b$ and γ denote absolute effective digits that are integers.

Specifically, the input unit 11 inputs computer numbers for which a sign, high order max, low order max, absolute effective digit, and number of arrays are set.

The storage unit 12 stores computer numbers and is a so-called buffer. The buffer is reserved based on the high order max and the low order max inputted by the input unit 11.

Figure 3:
FIG. 3 illustrates a buffer for storing a computer number.

FIG. 3 illustrates a buffer for storing computer numbers. As shown in FIG. 3, a plurality of arrays in which data of the same type are arranged in a row are stored in the buffer. For example, by reserving 10 arrays of 32 bit array, it is possible to reserve 320 binary digits (C=2) for internal processing of a computer. In the case of an octal number (C=8), up to 106 digits can be reserved by separating every three digits starting from the decimal point, and in the case of a hexadecimal number (C=16), up to 80 digits can be reserved by separating every four digits starting from the decimal point.

The arithmetic unit 13 performs an arithmetic operation by using the definite numbers $a_1$ and $b_1$ of computer numbers stored in the storage unit 12, determines an absolute effective digit r so as to satisfy the following formula (3), and stores, in the storage unit 12, computer numbers as the result of the arithmetic operation.

$$(A,B) = (a,b)_1 + (a,b)_2, -C^{\gamma} \leq (a,b)_2 < C^{\gamma} \quad (3)$$

Herein C denotes a radix; γ is an exponent and is an absolute effective digit; and (A, B) is an arithmetic operation result of the real numbers A and B, $(a, b)_1$ is an arithmetic operation result of the definite numbers $a_1$ and $b_1$, and $(a, b)_2$ is an arithmetic operation result of the uncertain numbers $a_2$ and $b_2$.

The arithmetic operation of computer numbers is performed on the assumption that the real numbers A and B fall within the range of $a_1 - C^{ea} \leq A < a_1 + C^{ea}$ and $b_1 - C^{eb} \leq B < b_1 + C^{eb}$, respectively, so that the arithmetic operation result is also a computer number and thus satisfies the formula (3). The arithmetic operation of the computer number is divided into the definite numbers $a_1$, $b_1$ and the uncertain numbers $a_2$, $b_2$, the definite numbers $a_1$, $b_1$ are calculated as they are, and the absolute effective digit r of the arithmetic operation result is determined according to various conditions.

In the arithmetic operation of computer numbers, the maximum value of the absolute effective digit can be specified. In particular, for division and functions such as root, sin, and cos, the absolute effective digit can be specified. Thus, the numerical value of the absolute effective digit or more can be guaranteed.

The arithmetic operation of computer numbers is also considered to be a special pattern of interval arithmetic. However, the difference is that the interval arithmetic represents a real number as a range and performs four arithmetic operations on the range exactly, while the four arithmetic operations of computer numbers controls errors by the absolute effective digit. In addition, since the arithmetic operation of computer numbers is considered to be applied after determining a system of numbers instead of real numbers, the starting point thereof is different from the concept of interval arithmetic. Therefore, the arithmetic operation itself of computer numbers is simpler than interval arithmetic, and the arithmetic operation is simplified by using the absolute effective digit as an evaluation of errors (unclear parts).

According to such an information processing apparatus, only the part requiring the absolute effective digit can be calculated by a computer number arithmetic operation library, and the absolute effective digit of the arithmetic operation result can be confirmed, so that validated numerics can be easily performed.

The information processing apparatus preferably further includes a control unit 14 for converting a numerical arithmetic operation program for real numbers into a numerical arithmetic operation program for computer numbers, executing the numerical arithmetic operation program for computer numbers, and storing, in the storage unit 12, computer numbers obtained by the arithmetic operation in the arithmetic unit 13. Thus, the history of the absolute effective digit of each variable can be maintained during the execution of the numerical arithmetic operation program for computer numbers, and it is possible to check whether the required absolute effective digit can be finally obtained. It is also possible to inversely calculate the absolute effective digit of the value of each variable required for an arithmetic operation of a desired absolute effective digit.

Hardware Configuration

Figure 4:
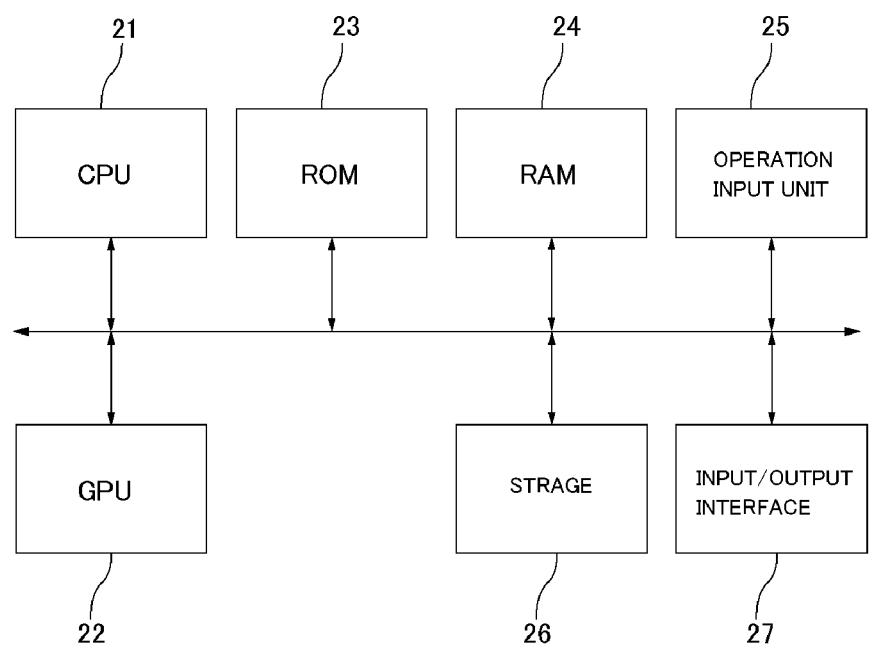
FIG. 4 is a block diagram illustrating a hardware configuration for performing the function of the information processing apparatus.

FIG. 4 is a block diagram illustrating a hardware configuration for performing the function of the information processing apparatus. As shown in FIG. 4, the information processing apparatus includes a CPU (Central Processing Unit) 21 for executing a program, a GPU (Graphics Processing Unit) 22 for performing arithmetic processing, a ROM (Read Only Memory) 23 for storing a program executed by the CPU 21, a RAM (Random Access Memory) 24 for deploying a program or data, an operation input unit 25 for receiving various input operations by a user, a storage 26 for persistently storing a program or data, and an input/output interface 27 for inputting/outputting data. That is, the information processing apparatus 2 shown in FIG. 4 is a so-called computer.

The CPU 21 is capable of executing processes of the arithmetic unit 13 and the control unit 14 in the functional configuration shown in FIG. 1, performs arithmetic operation of computer numbers with a computer number arithmetic operation library, and stores, in the storage unit 12, computer numbers obtained by the arithmetic operation. The CPU 21 reads a numerical arithmetic operation program for computer numbers recorded in the storage 26, for example, and deploys the program in the RAM 24 to execute it, thereby controlling the operation of each block.

The GPU 22 has a video memory (VRAM), can perform drawing processing and arithmetic operation processing in response to a request from the CPU 21, and may calculate computer numbers by the computer number arithmetic operation library. The ROM 23 is, for example, a read-only nonvolatile memory, and stores information such as constants necessary for the operation of each block of the information processing apparatus 2. The RAM 24 is a volatile memory, and is used not only as a deployment area for an arithmetic program but also as a storage area for temporarily storing intermediate data or the like outputted during the operation of each block of the information processing apparatus 2.

The operation input unit 25 can control the function of the input unit 11 in the functional configuration shown in FIG. 1, and is a user interface used for input operations on the information processing apparatus. The operation input unit 25 outputs instructions such as execution or stop of numerical arithmetic operation program processing to a CPU 21 according to input operations by a user.

The storage 26 records a numerical arithmetic operation program or the like deployed in the RAM 24. The storage 26 may be an HDD (Hard disk drive), an SSD (Solid State Drive), or an optical drive, among others. The input/output interface 27 can output images generated by the GPU 22 to a display device.

In such a hardware configuration, the functional configuration shown in FIG. 1 can be implemented by cooperation of the CPU 21, the GPU 22, the ROM 23, the RAM 24, and software executed by the CPU 21, among others. Alternatively, a software program may be downloaded via the Internet or the like, in addition to being stored in and distributed by a recording medium such as an optical disk or a semiconductor memory.

2. Arithmetic Operation of Computer Numbers

Hereinafter, the arithmetic operation method will be described with the radix of the computer number being 2 (C=2).

Addition

Assume that a real number A and a real number B are computer numbers defined by the formulas (1) and (2), respectively.

$$A = a_1 + a_2, |a_1| \leq C^{h_a}, -C^{e_a} \leq a_2 < C^{e_a} \tag{1}$$

$$A = b_1 + b_2, |b_1| \leq C^{h_b}, -C^{e_b} \leq b_2 < C^{e_b} \tag{2}$$

Herein $a_1$ and $b_1$ are definite numbers whose numerical values are definite, and $a_2$ and $b_2$ are uncertain numbers whose numerical values are uncertain; C denotes a radix; $h_a$ and $h_b$ respectively denote extended high order maxes that are minimum extended digits satisfying $|a_1| \leq C^{h_a}$ and $|b_1| \leq C^{h_b}$, and $h_a$ and $h_b$ respectively denote high order maxes that are integers; and $e_a$, $e_b$ and $\gamma$ denote absolute effective digits that are integers.

Hereinafter, m, n, and r will be used for explanation instead of the absolute effective digits $e_a$, $e_b$, and $\gamma$, respectively.

$$A+B = a_1 + a_2 + b_1 + b_2 = (a_1+b_1) + (a_2\beta b_2) \Rightarrow (a_1+b_1) - C^m - C^n \leq A+B < (a_1+b_1) + C^m + C^n$$

Assume that r is the smallest integer that satisfies $C^m + C^n \leq C^r$.

If m=n, then r=m+1; if m≠n, then r=max (m, n)+1, so r=max (m, n)+1.

$$A+B = (a_1+b_1) + +B)_2$$

$(a_1+b_1)$ is a definite number, $(A+B)_2$ is an uncertain number, $-C^r \leq (A+B)_2 < C^r$ is satisfied, and r is the absolute effective digit. The minimum order of the definite number ($a_1+b_1$) may be less than the absolute effective digit. A description will be given by classifying patterns according to the sign of ($a_1+b_1$).

FIG. 5 illustrates a case where ($a_1+b_1$)=$\alpha+\beta+\gamma$. As shown in FIG. 5, ($a_1$ $b_1$)=$\alpha+\beta+\gamma$, wherein $\alpha$ is a part equal to and more than (r+1) digit, $\beta$ is a part of r digit, and $\gamma$ is a part equal to and less than (r−1) digit.

$$(a_1+b_1)-C^r \leq A+B < (a_1+b_1)+C^r \Rightarrow (\alpha+\beta)+\gamma-C^r \leq A+B < (\alpha+\beta)+\gamma+C^r$$

If $\gamma>0$ (($a_1+b_1$)>0),
then ($\alpha+\beta$)−$C^r$−1≤A+B<($\alpha+\beta$)+$C^r$−1.
If $\gamma<0$ (($a_1+b_1$)<0),
then ($\alpha+\beta$)−$C^{r+1}$≤A+B<($\alpha+\beta$)+$C^{r+1}$.

Thus, ($\alpha+\beta$)−$C^{r+1}$≤A+B<($\alpha+\beta$)+$C^{r+1}$ holds, ($\alpha+\beta$) is a definite number, and the absolute effective digit is r+1.

If $\gamma=0$, then ($\alpha+\beta$)−$C^r$≤A+B<($\alpha+\beta$)+$C^r$ holds, ($\alpha+\beta$) is a definite number, and the absolute effective digit is r.

Multiplication $$A*B=(a_1+a_2)*(b_1+b_2)=a_1b_1+a_2b_1+a_1b_2 a_2b_2$$

Assume that A and B are both positive.

$a_1 \leq C^\alpha$; $\alpha$ is the smallest integer that satisfies the inequality. It is preferably $\log_2|a_1|$.

$b_1 \leq C^\beta$; $\beta$ is the smallest integer that satisfies the inequality. It is preferably $\log_2|b_1|$.

$$-C^m C^\beta \leq a_2 b_1 < C^m C^\beta,$$

$$-C^\alpha C^m \leq a_1 b_2 < C^\alpha C^m, \text{ and}$$

$$-C^m C^n < a_2 b_2 \leq C^m C^n,$$

therefore, $$a_1b_1 - C^m C^\beta - C^m - C^m C^n < A*B < a_1b_1 + C^m C^\beta + C^\alpha C^m + C^m C^n \Rightarrow a_1 b_1 - C^{m+\beta} - C^{\alpha+m} - C^{m+n} < A*B < +C^{m+\beta} + C^{\alpha+m} + C^{m+n}$$

Assume that r is the smallest integer that satisfies $C^{m+\beta}+C^{\alpha+m}+C^{m+m} \leq C^r$.

$$A*B = a_1 b_1 + (A*B)_2$$

$a_1 b_1$ is a definite number, $(A*B)_2$ is an uncertain number, $-C^r \leq (A*B)_2 < C^r$ is satisfied, and r is the absolute effective digit. The minimum order of the definite number $a_1 b_1$ may be less than the effective digit.

The definite number and the absolute effective digit considering the meaningless digit part are the same as the positive case in addition.

FIG. 6 illustrates a method for determining the minimum integer r that satisfies $C^{m+\beta}+C^{\alpha+m}+C^{m+n} \leq C^r$. In FIG. 6, each frame denotes a position of a 2-bit array, white circles a denote bit positions of $C^{m+\beta}$, $C^{\alpha+m}$, and $C^{m+n}$, black circles b denote bit positions of $C^r$, and dotted line circles c denote empty bits.

Assuming that r is the smallest integer that satisfies $C^{m+\beta}+C^{\alpha+m}+C^{m+n} \leq C^r$, then $C^{m+\beta}+C^{\alpha+m}+C^{m+n}=C^r$ holds only in pattern 3. Further, r that satisfies $C^{m+\beta}+C^{\alpha+m}+C^{m+n} \leq C^r$ is the maximum value+2 (r=max (m, n)+2) if (m+$\beta$), ($\alpha$+n), and (m+n) are pattern 1 or pattern 2, or is the maximum value+1 (r=max (m, n)+1) otherwise. Moreover, r that satisfies $C^{m+\beta}+C^{\alpha+m}+C^{m+n}<C^r$ is the maximum value+2 (r=max (m, n)+2) when (m+$\beta$), ($\alpha$+n) and (m+n) are pattern 1, pattern 2 or pattern 3, or is the maximum value+1 (r=max (m, n)+1) otherwise.

3. Specific Examples

Next, arithmetic operation examples of software using the computer numbers described above will be described. FIG. 7 illustrates an example of computer numbers expressed in C language, and FIG. 8 illustrates an example of forms of multiplication, addition, and division of computer numbers expressed in C language.

As shown in FIG. 7, the computer number is defined by sign s, high order max h, low order max l, absolute effective digit e, number of arrays n, and array a. The sign s=1 indicates positive and s=−1 indicates negative. The high order max h is a value satisfying |definite number|≤$\log_2$ h. The low order max l is the least significant digit in the binary notation of the definite number. The absolute effective digit e is the minimum integer satisfying −$2^e$≤uncertain number <$2^e$. The number of arrays n is the number of unsigned integers that store the definite number. The array a is an unsigned integer array that stores the definite number. The effective digit k is the minimum integer satisfying ($\log_2$|definite number|−absolute effective digit)≤k.

In the multiplication, addition, and division of computer numbers shown in FIG. 8, computer numbers are treated as variables. For division, It is necessary to set the absolute effective digit.

Arithmetic operation of Rump formula

The value of f (a, b) obtained by substituting a=77617 and b=33096 into the following formula devised by S. M. Rump is evaluated.

$$f(x,y)=333.75y^6+x^2(11x^2y^2-y^6-121y^4-2)+55y^8+x/2y$$

When this arithmetic operation is executed on the IBM mainframe S/370 with different operational precision, the following results are obtained.

Single precision (approximately 8 decimal digits): f (x, y)≈1.1720603 . . . .

Double precision (approximately 17 decimal digits): f (x, y)≈1.17206039400531 . . . .

Extended precision (approximately 34 decimal digits): f (x, y)≈1.1720603940053178 . . . .

The true value is f (a, b)=−0.827386 . . . ; therefore the arithmetic operations on S/370 have wrong results whose signs are not even correct.

FIG. 9 illustrates an example program for computing the Rump formula in C language and FIG. 10 illustrates an example in which the program example shown in FIG. 9 is converted into a program using computer numbers. As shown in FIGS. 10 and 9, the positive part f1 and the negative part f2 were calculated, and the difference f was determined. In the division of "inverse digital formula (&k2y, −200, &k2yinv, & status)", the absolute effective digit was set to −200.

$$f1=333.75y^6+x^2*11x^2y^2+55y^8+x/2y$$

$$f2=x^2*y^6+x^2*121y^4+x^2*2$$

$$f=f1-f2$$

Figures 13, 14:
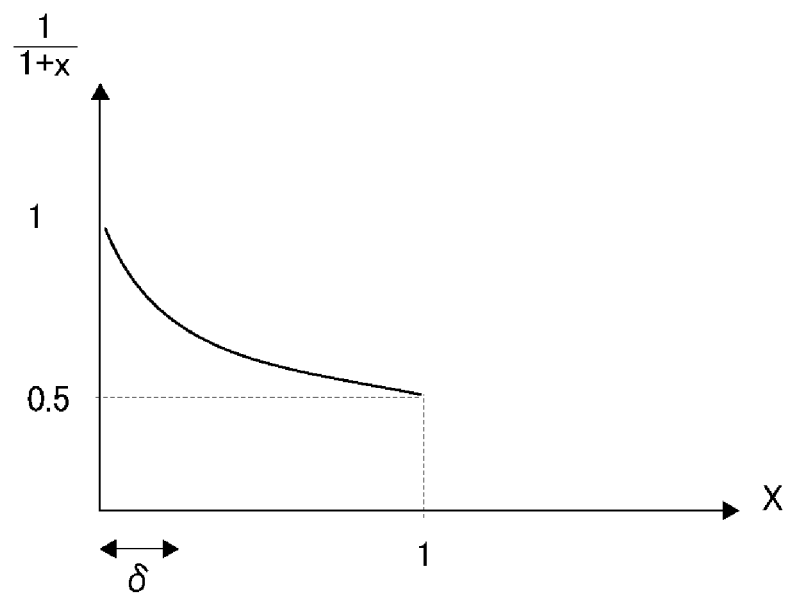
FIG. 13 illustrates an example of a bit representation of the arithmetic operation result of the difference f.
FIG. 14 is a graph of $y=1/(1-x)$.

FIG. 11 illustrates a bit representation of the arithmetic operation result of the positive part f1, FIG. 12 illustrates a bit representation of the arithmetic operation result of the negative part f2, and FIG. 13 illustrates a bit representation of the arithmetic operation result of the difference f. As illustrated by the bit representation of the positive part f1 and the negative part f2, the bit patters match within the frame shown. It can be seen that more than 139 bits are required to calculate the difference f (=f1−f2) correctly. The arithmetic operation result of the difference f is −0.8273960599 . . . , which is slightly different from the true value, but is much better than the arithmetic operation on S/370.

Arithmetic Operation of Series $$1/(1-x)=1-x+x^2+\ldots+(-1)^n x^n \ldots \quad (-1<x<1)$$

A formula of Maclaurin expansion is evaluated. If terms $-x+x2+\ldots+(-1)^n x^n \ldots$ are added sequentially to $1-1/(1-x)$, then the result should approach 0.

FIG. 14 is a graph of $y=1/(1-x)$. As shown in FIG. 14, $\delta$ was set to $1/1000$, $1/10000$, $1/100000$, and $1/1000000$, respectively, and this $\delta$ was divided into 100 and the above arithmetic operation was performed to evaluate errors. The number of terms n was set to 50.

Table 1 shows the results of arithmetic operations using double precision floating-point. There were no differences in errors depending on S. It is revealed that, since each term of the intermediate series is a sum of values smaller than the initial value when calculating the sum of the series, the effective digit is smaller than the initial value. It might be difficult to calculate the sum of series even when double precision floating-point numbers are used. On the other hand, in the arithmetic operation of computer numbers, the result was 0 when calculated with the effective digit being −500.

TABLE 1

| δ | 1 − 1/(1 + 100 δ) | x = 100 δ | series sum |
|---|---|---|---|
| 1/1000 | 0.000999001 | 0.001 | −1.449E−16 |
| 1/10000 | 9.999E−05 | 1E−04 | 1.6616E−17 |
| 1/100000 | 9.9999E−06 | 1E−05 | 5.645E−17 |
| 1/1000000 | 9.99999E−07 | 1E−06 | −6.114E−17 |

2. Second Embodiment

Hereinafter, a second embodiment of the present technology will be described in detail in the following order with reference to the drawings. It should be noted that the present technology is not limited to the following embodiment, and various modifications may be made without departing from the scope of the present technology.
2-1. Information Processing Apparatus
2-2. Arithmetic Operation of High-Precision Computer Numbers
2-3. Example In the arithmetic operation of the multiplication of computer numbers according to the first embodiment, since the absolute effective digit increases by about three digits, the accuracy of computer numbers decreases rapidly when multiplications are repeated. Further, in additions with different absolute effective digit, since the absolute effective digit always increases by one, the accuracy surely decreases when additions are repeated.

Therefore, in the second embodiment, high-precision computer numbers are used instead of computer numbers in the first embodiment. The high-precision computer numbers uses extended digits (extended high order max and extended absolute effective digit) $(\alpha+\alpha')$ instead of the digits in the computer number (high order max and absolute effective digit). Herein, a is an integer, and this value is the number of digits. $\alpha'$ is a decimal digit which is a decimal of $0 \leq \alpha' < 1$, and for example, a' may be $a/2^n (0 \leq a < 2^n)$.

When generating a high-precision computer number at first, the extended absolute effective digit is an integer. The decimal digit of the extended absolute effective digit can suppress the deterioration of precision in the case where the four arithmetic operations are repeated, and is particularly effective when there is a difference in the absolute effective digits.

2-1. Information Processing Apparatus

Functional Configuration

Figure 15:
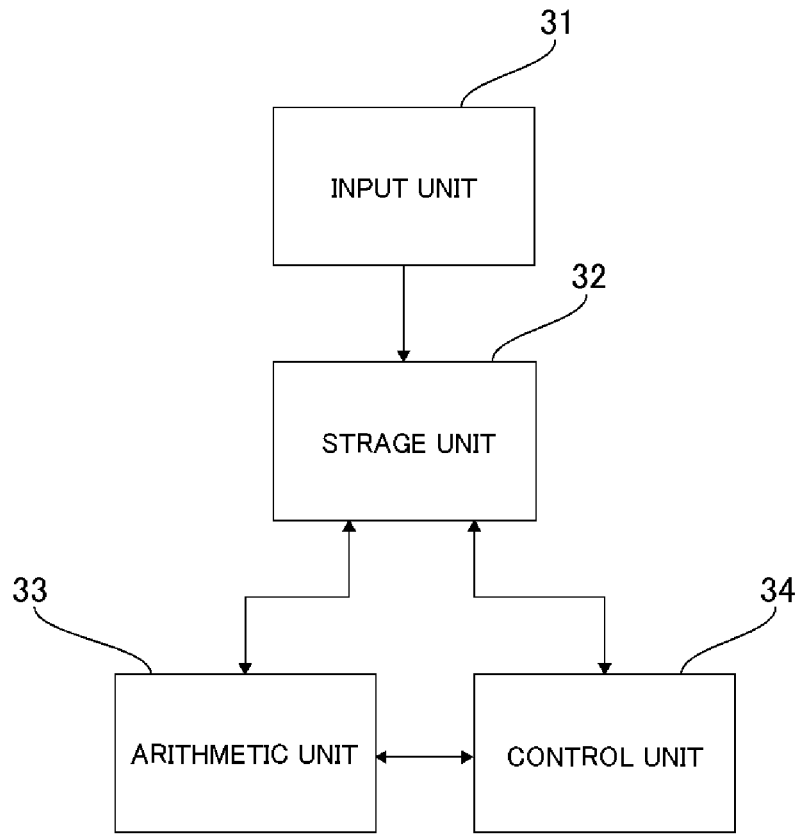
FIG. 15 is a block diagram illustrating a functional configuration of an information processing apparatus according to a second embodiment of the present technology.

FIG. 15 is a block diagram illustrating a functional configuration of an information processing apparatus according to a second embodiment of the present technology. As shown in FIG. 15, the information processing apparatus is provided with an input unit 31 for inputting a high-precision computer number in which real numbers A and B are respectively defined by the following formulas (11) and (12); a storage unit 32 for storing the high-precision computer number; and an arithmetic unit 33 that performs an arithmetic operation by using definite numbers $a_1$ and $b_1$ of the high-precision computer number stored in the storage unit 32, determines an extended absolute effective digit $(\gamma+\gamma')$ so as to satisfy the following formula (13), and storing, in the storage unit 32, the high-precision computer number as the result of the arithmetic operation.

$$A=a_1+a_2, |a_1| \leq C^{h_a+h_a'}, -C^{e_a+e_a'} \leq a_2 < C^{e_a+e_a'} \quad (11)$$

$$B=b_1+b_2, |b_1| \leq C^{h_b+h_b'}, -C^{e_b+e_b'} \leq b_2 < C^{e_b+e_b'} \quad (12)$$

$$(A,B)=(a,b)_1+(a,b)_2, -C^{\gamma+\gamma'} \leq (a,b)_2 < C^{\gamma+\gamma'} \quad (13)$$

Herein $a_1$ and $b_1$ are definite numbers whose numerical values are definite, and $a_2$ and $b_2$ are uncertain numbers whose numerical values are uncertain; C denotes a radix; $h_a+h_a'$ and $h_b+h_b'$ respectively denote extended high order maxes that are minimum extended digits satisfying $|a_1| \leq C^{h_a+h_a'}$ and $|b_1| \leq C^{h_b+h_b'}$; $h_a$ and $h_b$ respectively denote high order maxes that are integers; $h_a'$ and $h_b'$ respectively denote decimal digits that are decimals of $0 \leq h_a' < 1$ and $0 \leq h_b' < 1$; $e_a+e_a'$, $e_b e_b'$, and $\gamma+\gamma'$ denote extended absolute effective digits that are extended digits; $e_a$, $e_b$, and $\gamma$ denote absolute effective digits that are integers; $e_a'$, $e_b'$, and r' respectively denote decimal digits that are decimals of $0 \leq e_a' < 1$, $0 \leq e_b' < 1$, and $0 \leq r' < 1$; (A, B) is the arithmetic operation result of the real numbers A and B; $(a, b)_1$ is the arithmetic operation result of the definite numbers $a_1$ and $b_1$; and $(a, b)_2$ is the arithmetic operation result of the uncertain numbers $a_2$ and $b_2$.

The radix C of the computer number is not particularly limited, but is preferably 2, 8, or 16. Thus, it is possible to verify the arithmetic operation of binary, octal or hexadecimal numbers used in general-purpose computers.

The decimal digits $h_a'$, $h_b'$, $e_a$, $e_b'$, and r' are preferably $h_a'/2^n$ $(0 \leq h_a' < 2^n)$, $h_b'$ $2^n$ $(0 \leq h_b' < 2m)$, $e_a'/2^n$ $(0 \leq e_a' < 2^n)$, $e_b'/2^n$ $(0 \leq e_b' < 2^n)$, $r'/2^n$ $(0 \leq r' < 2^n)$, respectively, and n is a natural number. n is preferably 32 or less, more preferably 16 or less, and still more preferably 8 or less. Increasing n improves precision, but increases arithmetic operation cost. It should be noted that, when the decimal digits $h_a'$, $h_b'$, $e_a'$, $e_b'$, and r' are 0, this is the computer number according to the first embodiment.

Figure 16:
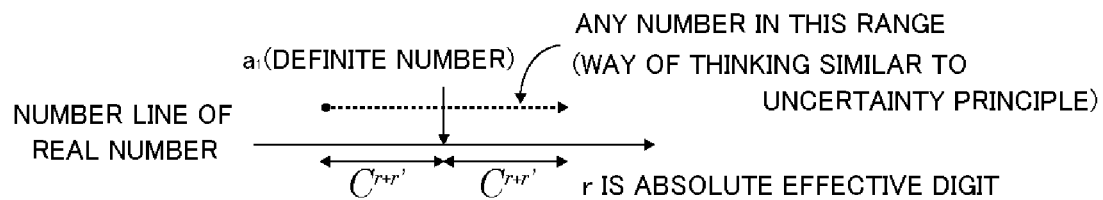
FIG. 16 illustrates a relation between a real number and a high-precision computer number.

FIG. 16 illustrates a relation between a real number and a high-precision computer number. As shown in FIG. 16, in the high-precision computer number $(a_1+a_2)$, the real number A is any number in a range of $a_1-C^{\gamma+\gamma'} \leq A < a_1+C^{\gamma+\gamma'}$, which is a way of thinking similar to the uncertainty principle. The definite number $a_1$ is a numerical value valid up to the extended absolute effective digit (least significant digit), and the numerical value is guaranteed. Herein, the extended absolute effective digit indicates the reliable digits after the decimal point, and is the value of $\gamma+\gamma'$ defining the error $C^{\gamma+\gamma'}$. $\gamma'$ is the decimal digit of $0 \leq \gamma' < 1$. If $a_2=0$ (extended absolute effective digit is infinitesimal), then the number is a definite computer number, otherwise the number is uncertain computer number whose numerical value is uncertain.

The input unit 31 inputs the high-precision computer number in which real numbers A and B are respectively defined by the following formulas (11) and (12).

$$A=a_1+a_2, |a_1| \leq C^{h_a+h_a'}, -C^{e_a+e_a'} \leq a_2 < C^{e_a+e_a'} \tag{11}$$

$$B=b_1+b_2, |b_1| \leq C^{h_b+h_b'}, -C^{e_b+e_b'} \leq b_2 < C^{e_b+e_b'} \tag{12}$$

Herein $a_1$ and $b_1$ are definite numbers whose numerical values are definite, and $a_2$ and $b_2$ are uncertain numbers whose numerical values are uncertain; C denotes a radix; $h_a+h_a'$ and $h_b+h_b'$ respectively denote extended high order maxes that are minimum extended digits satisfying $|a_1| \leq C^{h_a+h_a'}$ and $|b_1| \leq C^{h_b+h_b'}$, $h_a$ and $h_b$ respectively denote high order maxes that are integers; $h_a'$ and $h_b'$ respectively denote decimal digits that are decimals of $0 \leq h_a' < 1$ and $0 \leq h_b' < 1$; $e_a+e_a'$, $e_b+e_b'$, and $\gamma+\gamma'$ denote extended absolute effective digits that are extended digits; $e_a$ and $e_b$ denote absolute effective digits that are integers; $e_a'$ and $e_b'$ respectively denote decimal digits that are decimals of $0 \leq e_a' < 1$ and $0 \leq e_b' < 1$;

Specifically, the input unit 31 inputs high-precision computer numbers for which a sign, high order max h that is the most significant digit, decimal digit h' of the high order max (high order max sub), low order max l that is the least significant digit, the absolute effective digit e (effective digit), the decimal digit e' of the absolute effective digit (effective digit sub), and number of arrays are set.

The storage unit 32 stores the high-precision computer number and is a so-called buffer. The buffer is reserved based on the high order max h and the low order max l inputted by the input unit 31. For example, as shown in FIG. 3, a plurality of arrays in which data of the same type are arranged in a row can be stored in the buffer.

The arithmetic unit 33 performs an arithmetic operation by using the definite numbers $a_1$ and $b_1$ of the computer numbers stored in the storage unit 32, determines the extended absolute effective digit ($\gamma+\gamma'$) so as to satisfy the following formula (13), and stores, in the storage unit 32, computer numbers as the result of the arithmetic operation.

$$(A,B)=(a,b)_1+(a,b)_2, -C^{\gamma+\gamma'} \leq (a,b)_2 < C^{\gamma+\gamma'} \tag{13}$$

Herein C denotes a radix; $\gamma+\gamma'$ denotes the extended absolute effective digit, $\gamma$ denotes the absolute effective digit which is an integer, and $\gamma'$ denotes the decimal digit which is a decimal of $0 \leq \gamma' < 1$; (A, B) is an arithmetic operation result of the real numbers A and B, $(a, b)_1$ is an arithmetic operation result of the definite numbers $a_1$ and $b_1$, and $(a, b)_2$ is an arithmetic operation result of the uncertain numbers $a_2$ and $b_2$.

The arithmetic operation of the high-precision computer number is performed by assuming that the real numbers A and B fall within the range of $a_1 - C^{e_a+e_a'} \leq A < a_1 + C^{e_a+e_a'}$ and $b_1 - C^{e_b+e_b'} \leq B < b_1 + C^{e_b+e_b'}$ respectively, so that the arithmetic operation result is also the high-precision computer number and thus satisfies the formula (13). The arithmetic operation of the high-precision computer number are divided into the definite numbers $a_1$, $b_1$ and the uncertain numbers $a_2$, $b_2$, the definite numbers $a_1$, $b_1$ are calculated as they are, and the extended absolute effective digit ($\gamma+\gamma'$) of the arithmetic operation result is determined according to various conditions. It should be noted that the effective digit k is the smallest integer that satisfies $\log_C|\text{definite number}|-\text{extended absolute effective digit } (\gamma+\gamma') \leq k$.

In the arithmetic operation of addition (A+B), the arithmetic unit 33 can set the minimum extended digit satisfying the following formula (14) as the extended absolute effective digit.

$$C^{e_a+e_a'}+C^{e_b+e_b'} \leq C^{\gamma+\gamma'} \tag{14}$$

In the arithmetic operation of multiplication (A*B), the arithmetic unit 33 can set the minimum extended digit satisfying the following formula (15) as the extended absolute effective digit.

$$C^{h_b+e_a+h_b'+e_a'}+C^{h_a+e_b+h_a'+e_b'}+C^{e_a+e_b+e_a'+e_b'} \leq C^{\gamma+\gamma'} \tag{15}$$

In the arithmetic operation of division (B/A), the arithmetic unit evaluates the following formula (18) as the high-precision computer number defined by the following formulas (16) and (17) by using $h_a+h_a'-1/256$ and $h_b+h_b'-1/256$ instead of $h_a+h_a'$ and $h_b+h_b'$, respectively, to determine the extended absolute effective digit.

$$A = a_1 + a_2, |a_1| > C^{h_a+h_a'-\frac{1}{256}}, \tag{16}$$
$$-C^{e_a+e_a'} \leq a_2 < C^{e_a+e_a'}$$

$$B = b_1 + b_2, |b_1| > C^{h_b+h_b'-\frac{1}{256}}, \tag{17}$$
$$-C^{e_b+e_b'} \leq b_2 < C^{e_b+e_b'}$$

$$\frac{B}{A} = \frac{b_1+b_2}{a_1+a_2} = \frac{b_1}{a_1} + \frac{b_2 a_1 - b_1 a_2}{a_1(a_1+a_2)} \tag{18}$$

In four arithmetic operations of the high-precision computer number, it is necessary to perform arithmetic operations such as $|a| \leq \inf C^{\alpha+\alpha'}$ (C: radix, a: definite number), $\sup C^{\alpha+\alpha'} + \sup C^{\beta+\beta'} \leq \inf C^{\gamma+\gamma'}$ (C: radix), and $\inf C^{\alpha+\alpha'} - \sup C^{\beta+\beta'} \geq \sup C^{\gamma+\gamma'}$ (C: radix). Herein, supA denotes the upper limit value of A, and infA denotes the lower limit value of A.

Preferably, the arithmetic unit 33 performs arithmetic operations for $|a| \leq \inf C^{\alpha+\alpha'}$ by using a list table of values $\alpha$ for $\alpha'$ when $\alpha=0$, for $\sup C^{\alpha+\alpha'} + \sup C^{\beta+\beta'} \leq \inf C^{\gamma+\gamma'}$ by using a list table of values $\gamma$ and $\gamma'$ for $\alpha'$, $\beta$ and $\beta'$ when $\alpha=0$, and for $\inf C^{\alpha+\alpha'} - \sup C^{\beta+\beta'} \geq \sup C^{\gamma+\gamma'}$ by using a list table of values $\gamma$ and $\gamma'$ for $\alpha'$, $\beta$ and $\beta'$ when $\alpha=0$. Thus, the arithmetic operations of the high-precision computer numbers can be accelerated.

Further, it is preferable that the arithmetic unit 33 trims the definite numbers of $\sup C^{\alpha+\alpha'} + \sup C^{\beta+\beta'} \leq \inf C^{\gamma+\gamma'}$ based on the difference of $\inf C^{\gamma+\gamma'} - (\sup C^{\alpha+\alpha'} + \sup C^{\beta+\beta'})$. This can suppress the arithmetic operation cost when the arithmetic operations are repeated. Similarly, for $\inf C^{\alpha+\alpha'} - \sup C^{\beta+\beta'} \geq \sup C^{\gamma+\gamma'}$, trimming the definite numbers based on the difference of $\inf C^{\alpha+\alpha'} - \sup C^{\beta+\beta'} - \sup C^{\gamma+\gamma'}$ can suppress the arithmetic operation cost when the arithmetic operations are repeated.

The information processing apparatus preferably further includes a control unit 34 for converting a numerical arithmetic operation program for real numbers into a numerical arithmetic operation program for high-precision computer numbers, executing the numerical arithmetic operation program for high-precision computer numbers, and storing, in the storage unit 32, computer numbers obtained by the arithmetic operation in the arithmetic unit 33. Specifically, it is preferable to convert the floating-point representation to high-precision computer numbers. Thus, the history of the extended absolute effective digit of each variable can be maintained during the execution of the numerical arithmetic operation program for high-precision computer numbers, and it is possible to check whether the required extended absolute effective digit can be finally obtained. It is also possible to inversely calculate the absolute effective digit of the value of each variable required for an arithmetic operation of a desired extended absolute effective digit arithmetic operation.

Such an information processing apparatus can calculate only the part requiring the extended absolute effective digit by the high-precision computer number arithmetic operation library, and confirm the extended absolute effective digit of the arithmetic operation result, so that validated numerics can be easily performed.

Hardware Configuration

The information processing apparatus may have a hardware configuration shown in FIG. 4, for example, as in the first embodiment. In the hardware configuration shown in FIG. 4, the functional configuration shown in FIG. 15 can be implemented by cooperation of the CPU 21, the GPU 22, the ROM 23, the RAM 24, and software executed by the CPU 21, among others. Alternatively, a software program may be downloaded via the Internet or the like, in addition to being stored in and distributed by a recording medium such as an optical disk or a semiconductor memory. Alternatively, the functional configuration shown in FIG. 15 may be incorporated into an FPGA (Field Programmable Gate Array).

2. Arithmetic Operation of High-Precision Computer Numbers

Hereinafter, the arithmetic operation method will be described with the radix of the high-precision computer number being 2 (C=2), and the decimal digits $h_a'$, $h_b'$, $e_a'$, $e_b'$, and $r'$ of the exponents being $h_a'/2^8$ ($0 \leq h_a' < 2^8$), $h_b'/2^8$ ($0 \leq h_b' < 2^8$), $e_a'/2^8$ ($0 \leq e_a' < 2^8$), $e_b'/2^8$ ($0 \leq e_b' < 2^8$), and $r'/2^8$ ($0 \leq r' < 2^8$), respectively. However, in order to simplify the description, the decimal digits of the exponents are also denoted as $h_a'$, $h_b'$, $e_a'$, $e_b'$, and $r'$.

If n=8, then, for example, in the relation of $\sup C^{\alpha+\alpha'} + \sup C^{\beta+\beta'} \leq \inf C^{\gamma+\gamma'}$, the difference of $\inf C^{\gamma+\gamma'} - (\sup C^{\alpha+\alpha'} + \sup C^{\beta+\beta'})$ does not become 0 except in a specific case, and a gap occurs. Since the arithmetic operation is not affected even if the part below this gap is truncated, trimming processing can be performed, thereby suppressing the arithmetic operation cost when the arithmetic operations are repeated.

Figure 17:
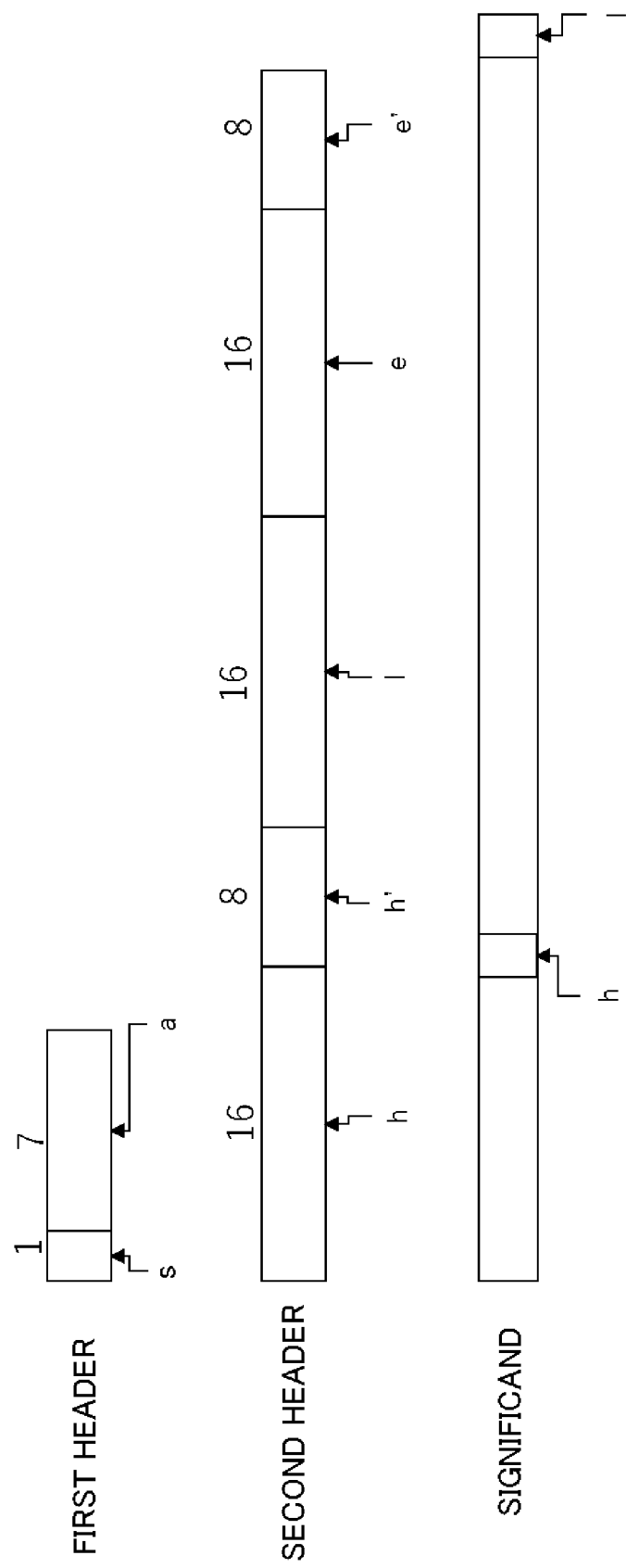
FIG. 17 illustrates an example of a computer-generated numerical representation of a high-precision computer number.

FIG. 17 illustrates an example of a computer-generated numerical representation of a high-precision computer number, and FIG. 18 illustrates an example of a definition of the high-precision computer number. As shown in FIG. 17, the first header includes a code s of 1 bit and an array of 7 bit size. The second header has a high order max h of 16 bits, a decimal digit of h' of the high order max of 8 bits, a low order max l of 16 bits, an absolute effective digit e of 16 bits, and a decimal digit e' of the absolute effective digit of 8 bits.

The significand stores arrays a of 32 bits, and the maximum number of the arrays a is 127. Since the array a is an unsigned integer value, the maximum size of the significand is 127*32=4064 bits. This can represent 1223 digits in the decimal notation. For example, since a light year is 9.5 trillion km<10 trillion km=$10^{13}$ km=$10^{19}$ mm=$10^{25}$ nm, assuming the size of the universe is 137 light years, or about 100 light years, 100 light years=$10^{10}$ light years=$10^{35}$ nm, so that 35 digits (decimal number) are sufficient to express the size of the universe in nm. In relation to this matter, by using the high-precision computer numbers, arithmetic operation of very large order can be performed.

Signed 16 bit integers can be used for the high order max (most significant digit) h, the low order max (least significant digit) l, and the absolute effective digit (effective digit) e. A signed 16 bit integer is ±32768, so a sufficient representation is possible. It should be noted that, when the absolute effective digit e is −32768 (1000000000000000 in the binary notation), the error is regarded as 0.

For the decimal digit h' of the high order max and the decimal digit e' of the absolute effective digit, an unsigned 8-bit integer such as an unsigned char variable in the C language can be used. When the decimal digit h' of the high order max is 0, there are two meanings. If h=1, then h' is 0 as it is, but if h>1, then h'=256 and the high order max is (h+1).

Treatment of the Uncertain Number 0

The range of an uncertain number is expressed as $-C^{e+e'} \leq$ (uncertain number) $< C^{e+e'}$ by using the extended absolute effective digit. If the absolute effective digit e is $-\infty$, then the possible width of the uncertain number is infinitely close to 0. In the representation of the high-precision computer numbers in a computer, the minimum value of the absolute effective digit e is −32768, and this value is treated as $-\infty$. If $e \to -\infty$, then the uncertain number is defined as 0. The value of the absolute effective digit e that can be taken in the arithmetic operation of the high-precision computer number is a value in the range from −32767 to 32767, and when it exceeds this range, it is treated as an arithmetic operation error.

0 in High-Precision Computer Number

The representation of 0 in the high-precision computer number is defined as follows.

s (sign)→0
h (high order max)−0
hd (decimal digit of the high order max)→0
l (low order max)→0
e (absolute effective digit)→calculated value
ed (decimal digit of the absolute effective digit)→calculated value
array a→a [0]=0

The size of the array a in high-precision computer numbers does not change, but the minimum value of the array a is set to 0 as an exception. In computer numbers other than 0, the 0th bit of the array a is always 1.

Extended Digit Table

Figure 19:
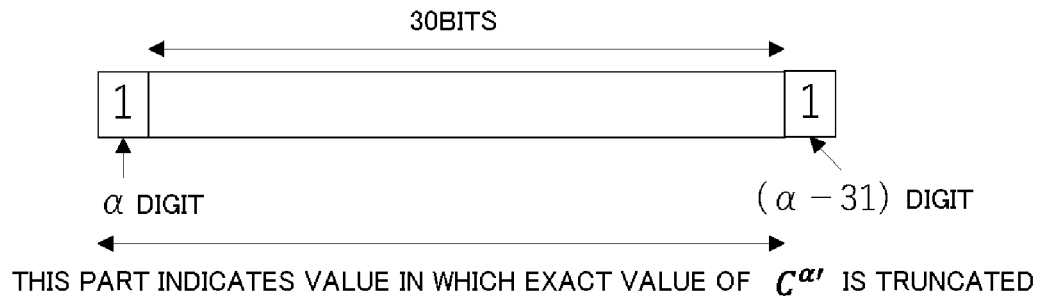
FIG. 19 illustrates an example of a 32 bit representation of A when $C^{\alpha+\alpha'}=A+B$ (A: definite number, B: uncertain number).

FIG. 19 illustrates an example of a 32 bit representation of A when $C^{\alpha+\alpha'}=A+B$ (A: definite number, B: uncertain number). The range of B is $-C^{\alpha-31} \leq B < C^{\alpha-31}$. In order to accelerate the arithmetic operation of the high-precision computer number, it is preferable to create in advance an extended digit table for outputting the value of A with respect to $\alpha'$ when $\alpha=0$.

Decimal Digit h' of Extended High Order Max

Figure 20:
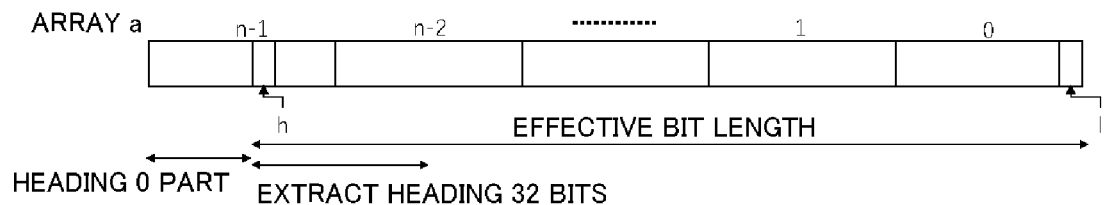
FIG. 20 illustrates how to determine the decimal digit h' of the extended high order max.
Figure 21:
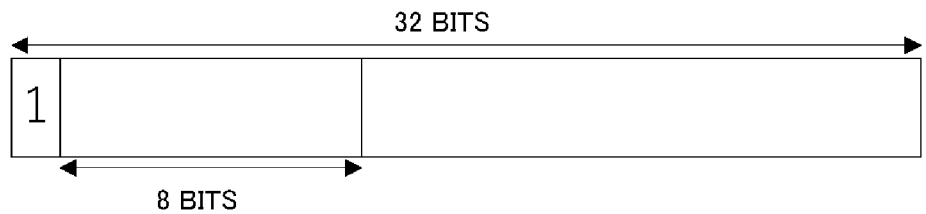
FIG. 21 illustrates 32 bits extracted in order to determine the decimal digit h' of the extended high order max.

FIG. 20 illustrates how to determine the decimal digit h' of the extended high order max, and FIG. 21 illustrates 32 bits extracted in order to determine the decimal digit h' of the extended high order max. Herein, it is assumed that the high order max h and the low order max l are definite. The high order max h denotes the most significant digit when the array a is represented by a bit string, and the low order max l denotes the least significant digit when the array a is represented by a bit string.

As shown in FIGS. 20 and 21, from the head of the effective bit length, 32 bits are extracted. If the effective bit length is more than 32 bits, then a bias value is set to 1, and if the effective bit length is equal to or less than 32 bits, then the bias value is set to 0.

The first 9 bits of the extracted 32 bits are used to calculate a' whose lower limit value is larger than the value obtained by dividing the first 9 bits by 256. This process is performed by referring to an 8 bit-α' table which outputs a' corresponding to an 8-bit integer.

Figure 22:
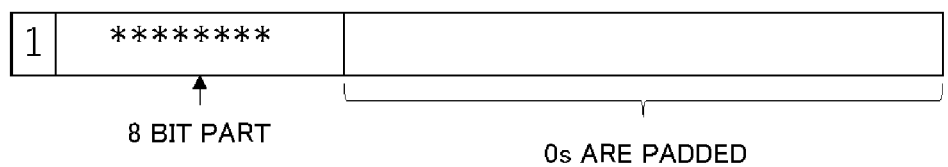
FIG. 22 illustrates an 8 bit-$\alpha'$ table.

FIG. 22 illustrates an 8 bit-α' table. The upper a's are checked from the 8 bit-α' table to determine a $C^{α'}$ having a lower limit value greater than 32 bits. More specifically, as shown in FIG. 22, when the 8-bit number is set to the left ******** part, an a' having a lower limit value equal to or higher than this is determined with reference to the above-mentioned extended digit table and is set as h'.

Addition

Assume that a real number A and a real number B are the high-precision computer numbers defined by the formulas (11) and (12), respectively.

$$A=a_1+a_2, |a_1|\leq C^{ha+ha'}, -C^{ea+ea'}\leq a_2 < C^{ea+ea'} \quad (11)$$

$$B=b_1+b_2, |b_1|\leq C^{hb+hb'}, -C^{eb+eb'}\leq b_2 < C^{eb+eb'} \quad (12)$$

wherein $a_1$ and $b_1$ are definite numbers whose numerical values are definite, and $a_2$ and $b_2$ are uncertain numbers whose numerical values are uncertain; C=2; $h_a+h_a'$ and $h_b+h_b'$ respectively denote extended high order maxes that are minimum extended digits satisfying $|a_1|\leq 2^{ha+ha'}$ and $|b_1|\leq 2^{hb+hb'}$; $h_a$ and $h_b$ respectively denote high order maxes that are integers, $h_a'$ and $h_b'$ respectively denote decimal digits that are $h_a'/256$ and $h_b'/256$; $e_a+e_a'$ and $e_b+e_b'$ denote extended absolute effective digits; $e_a$ and $e_b$ denote absolute effective digits that are integers; and $e_a'$ and $e_b'$ respectively denote decimal digits which are decimals of $e_a'/256$ and $e_b'/256$.

A+B is expressed by the following formulas (21) to (23).

$$A+B=a_1+a_2+b_1+b_2=a_1+b_1+a_2+b_2 \quad (21)$$

$$(a_1+b_1)-C^{ea+ea'}-C^{eb+eb'}\leq A+B<(a_1+b_1)+C^{ea+ea'}+C^{eb+eb'} \quad (22)$$

$$C^{ea+ea'}+C^{eb+eb'}\leq C^{γ+γ'} \quad (23)$$

The minimum extended digit that satisfies the formula (23) is determined. The values such as $C^{ea+ea'}$, $C^{eb+eb'}$ and $C^{γ+γ'}$ are expressed by high-precision computer numbers, and $\sup C^{ea+ea'}+\sup C^{eb+eb'}\leq \inf C^{γ+γ'}$ is determined. Herein, supA denotes the upper limit value of A, and infA denotes the lower limit value of A.

The case when the uncertain number is 0

If the uncertain number $b_2$ of the real number B is 0 in A+B shown in the formula (21), then the inequality shown in the formula (22) becomes the following formula (24).

$$(a_1+b_1)-C^{ea+ea'}\leq A+B<(a_1+b_1)+C^{ea+ea'} \quad (24)$$

Further, if the uncertain number $a_2$ of the real number A is 0, the uncertain number of A+B becomes 0. In this case, the trimming of the lower digits is not performed.

Extended Digit Addition Table

The arithmetic operation of $\sup C^{ea+ea'}+\sup C^{eb+eb'}\leq \inf C^{γ+γ'}$ as shown in the formula (23) uses an extended digit addition table which outputs the minimum extended digit (γ+γ') satisfying $C^α+C^{β+β'}\leq C^{γ+γ}$ for $C^α$ and $C^{β+β'}$. Herein, 0≥β, and α' and β' are α'/2⁸ and β'/2⁸, respectively.

Figure 23:
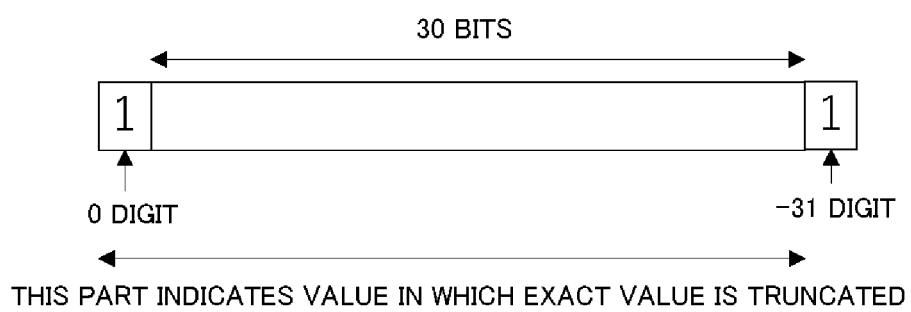
FIG. 23 illustrates an example of a 32 bit representation of A when $C^{\alpha'}=A+B$ (A: definite number, B: uncertain number).

FIG. 23 illustrates an example of a 32 bit representation of A when $C^{α'}=A+B$ (A: definite number, B: uncertain number). The range of B is $-C^{-31}\leq B<C^{-31}$. Herein, α' is α'/2⁸. Then, the minimum extend digit of $C^{γ+γ'}$ including the maximum possible value of $C^α+C^{β+β'}$ is determined. Specifically, $C^{γ+γ'}$ which satisfies $\sup C^{α'}+\sup C^{β+β'}\leq \inf C^{γ+γ'}$ is determined, and the difference $(\inf C^{γ+γ'}-(\sup C^{α'}+\sup C^{β+β'}))$ is calculated.

Figure 24:
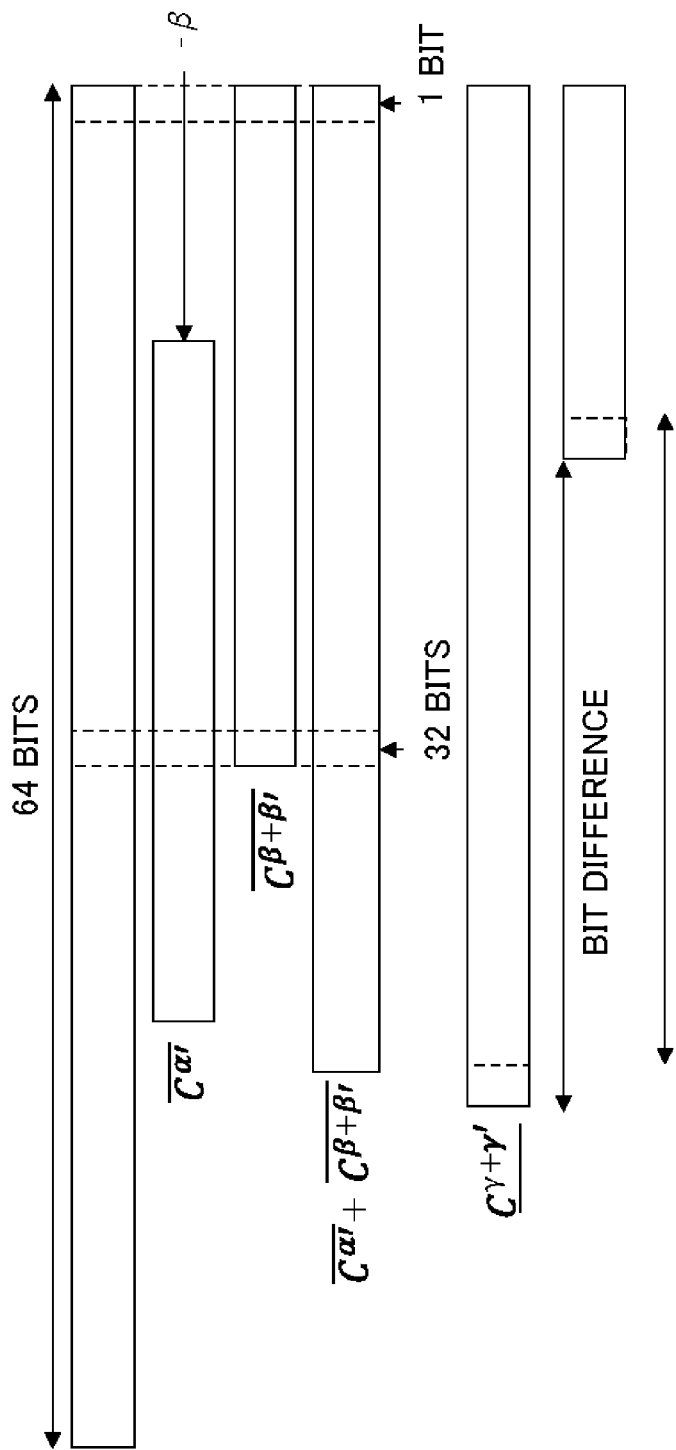
FIG. 24 illustrates a specific method for calculating $supC^{\alpha'}+supC^{\beta+\beta'}$.

FIG. 24 illustrates a specific method for calculating $\sup C^{α'}+\sup C^{β+β'}$. $\sup C^{α'}$ and $\sup C^{β+β'}$ are expressed by 32 bits, the least significant bit of $\sup C^{β+β'}$ is matched with the least significant bit of the 64 bits, and the arithmetic operation is performed by the unsigned 64 bit integer. This processing does not exceed the range of 64 bits. $\sup C^{α'}$ and $\sup C^{β+β'}$ are copied to 64 bits and $\sup C^{α'}$ is shifted to the left by −0 bits. Then, the sum of these values is calculated. In the arithmetic operation of the sum, the first non-0 bit is determined, and the most significant bit of the $\inf C^γ$ is aligned with the bit.

It is understood that in the definite number, the position of γ+β is the position of the original digits, and the lower digits that have been shifted from this position by the digits of the difference may be truncated. That is, the difference is absorbed into the offset.

Figure 25:
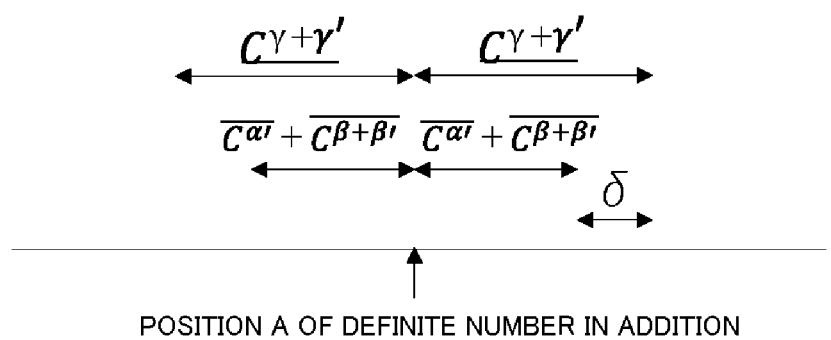
FIG. 25 illustrates a position of a definite number in addition of two high-precision computer numbers.

FIG. 25 illustrates a position of a definite number in addition of two high-precision computer numbers. As shown in FIG. 25, a definite number in addition of two computer numbers can be restricted by the width of an uncertain number $(\sup C^{α'}+\sup C^{β+β'})$. In order to restrict this by $C^{γ+γ'}$, the extended digit (γ+γ') satisfying $\sup C^{α'}+\sup C^{β+β'}\leq \inf C^{γ+γ'}$ is determined. Assuming that the difference $(\inf C^{γ+γ'}-(\sup C^{α'}+\sup C^{β+β'}))$ is δ, even if the position of the definite number is shifted by ±δ, as long as the error is within the range of $C^{γ+γ'}$, the high-precision computer number (definite number+uncertain number) is included in the range. Shifting the position A of the definite number by ±δ increases the error by ±δ as a whole, but in order to restrict $C^{α'}+C^{β+β'}\leq C^{γ+γ'}$, the δ error is allowed. Furthermore, the lower digits of the definite number are trimmed by using the error of δ.

Figure 26:
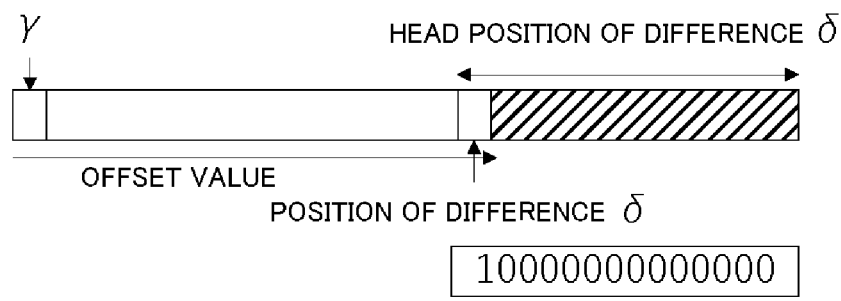
FIG. 26 illustrates a trimming process.

FIG. 26 illustrates a trimming process. As shown in FIG. 26, the part from the position of γ to the top of the hatched part is offset. The offset value means that the digits lower than or equal to the digit of the offset value from γ may be ignored. In an actual arithmetic operation, digits of (γ−offset) digit or lower are trimmed. Thus, it is possible to prevent the digits of the calculated value from increasing.

In $C^{α+α'}+C^{β+β'}\leq C^{γ+γ'}$, if (α+α') coincides with (β+β'), then γ=2α, γ'=α', and the offset value becomes ∞. This is actually expressed as 65535 (bit16max in the program), which is the maximum value of 16 bit integers. In this case, since the difference becomes 0, the digits of the calculated value becomes large. In the processing in this case, the same processing as the division described later is performed, so that (γ+γ')+1/256 is set to the extended absolute effective digit and the digits of the calculated value is restricted by using the difference between $C^{γ+γ'}$ and $C^{γ+γ+1/256}$.

The extended digit addition table is classified by 0 (integers between 0 and −32) and outputs γ, γ' and the digits of the difference for α' and β'.

(1) If β=0, α'≥β', then the extended digit (γ+γ') satisfying $\sup C^{α'}+\sup C^{β+β'}\leq \inf C^{γ+γ'}$ is determined, and the difference $(\inf C^{γ+γ'}-(\sup C^{α'}+\sup C^{β+β'}))$ is evaluated to create a table of α', β', γ, γ', and the digits of the difference.

(2) If β is −1 to −9, then the table of α', β', γ, γ', and the digits of the difference is created by determining the extended digit (γ+γ') satisfying $\sup C^{α'}+\sup C^{β+β'}\leq \inf C^{γ+γ'}$ and evaluating the difference $(\inf C^{γ+γ'}-(\sup C^{α'}+\sup C^{β+β'}))$ as in (1).

(3) If β is −10 to −32, then γ=−0 and γ'=α'+1, regardless of the value of β'. However, if α'=255, then γ=+1 and γ'=0.

By evaluating the difference $(\inf C^{\gamma+\gamma'}-(\sup C^{\alpha'}+\sup C^{\beta+\beta'}))$, the table of $\alpha'$, $\beta'$, $\gamma$, $\gamma'$, and the digits of the difference is created.

(4) If $\beta$ is $-33$ or less, then $\gamma=-\beta$ and $\gamma'=\alpha'+1$, regardless of the value of $\beta'$ as in (3). However, if $\alpha'=255$, then $\gamma=+1$ and $\gamma'=0$. By evaluating the difference $(\inf C^{\gamma+\gamma'}-(\sup C^{\alpha'}+\sup C^{\beta+\beta'}))$, the table of $\alpha'$, $\beta'$, $\gamma$, $\gamma'$, and the digits of the difference is created. The digits of the difference is 9 or less.

(5) If $\beta=0$ and $\alpha'=\beta'$, then the digits of the difference is 65535. This is the maximum value of unsigned single-precision integers. In this case, trimming of the array a is not performed.

Figures 27, 28:
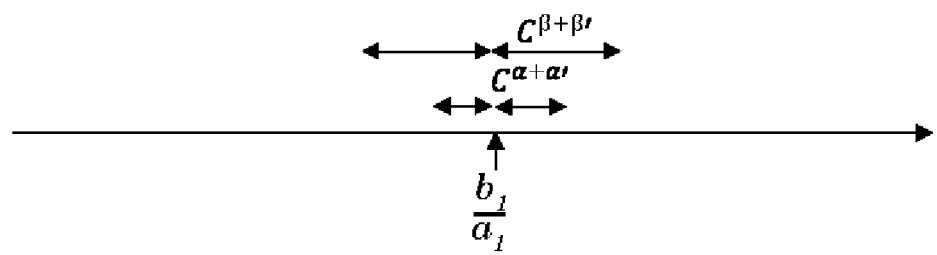
FIG. 27 illustrates an example of an extended digit addition table.
FIG. 28 illustrates a position of a definite number $(b_1/a_1)$ in division of high-precision computer numbers.

FIG. 27 illustrates an example of an extended digit addition table. The table in FIG. 27 shows the extended digits $(\gamma+\gamma')$ and the offset values for the values of $\alpha'$ and $\beta'$ when $\beta=0$. For the fourth column, whether it is the minimum extended digit $(\gamma+\gamma')$ satisfying $2^{2/256}+2^0 \leq 2^{1+2/256}$ is verified. The arithmetic operation results for the left and right sides are as follows.

$$2^{2/256}+2^0=2.0054299011\ldots$$

$$2^{1+2/256}=2.010859802\ldots$$

Further, since $2^{1+1/256}=2.005422550\ldots$, $2^{1+2/256}$ is the minimum value.

Further, the difference $(2^{1+2/256}-(2^{2/256}+2^0))$ is $0.0054299009\ldots$. Multiplying this value by 256 yields 1.3900546304. This indicates that when the value of the difference is shifted to the left by 8 bits, the head position becomes the position of $\gamma$. Therefore, it is shifted to the right by 8 bits from $\gamma$ so as to set the digits of the difference less than 9 to be 0.

Multiplication

Assume that a real number A and a real number B are the high-precision computer numbers defined by the formulas (11) and (12), respectively.

$$A=a_1+a_2, |a_1|\leq C^{h_a+h_a'}, -C^{e_a+e_a'}\leq a_2 < C^{e_a+e_a'} \quad (11)$$

$$B=b_1+b_2, |b_1|\leq C^{h_b+h_b'}, -C^{e_b+e_b'}\leq b_2 < C^{e_b+e_b'} \quad (12)$$

Herein $a_1$ and $b_1$ are definite numbers whose numerical values are definite, and $a_2$ and $b_2$ are uncertain numbers whose numerical values are uncertain; $C=2$; $h_a+h_a'$ and $h_b+h_b'$ respectively denote extended high order maxes that are minimum extended digits satisfying $|a_1|\leq 2^{h_a+h_a'}$ and $|b_1|\leq 2^{h_b+h_b'}$; $h_a$ and $h_b$ respectively denote high order maxes that are integers, $h_a'$ and $h_b'$ respectively denote decimal digits that are $h_a'/256$ and $h_b'/256$; $e_a+e_a'$ and $e_b+e_b'$ denote extended absolute effective digits; $e_a$ and $e_b$ denote absolute effective digits that are integers; and $e_a'$ and $e_b'$ respectively denote decimal digits which are decimals of $e_a'/256$ and $e_b'/256$.

$A*B$ is expressed by the following formula (31).

$$A\times B=(a_1+a_2)\times(b_1+b_2)=a_1 b_1+a_2 b_1+a_1 b_2+a_2 b_2 \quad (31)$$

Hereinafter, $h_a$, $h_a'$, $h_b$ and $h_b'$ are denoted by $m_a$, $m_a'$, $m_b$ and $m_b'$, respectively.

(1) If $A>0$ and $B>0$, then $a_1 \leq C^{ma+ma'}$, $b_1 \leq C^{mb+mb'}$, and the following formulas (32) to (34) are satisfied.

$$-C^{e_a+e_a'}C^{mb+mb'}\leq a_2 b_1 < C^{e_a+e_a'}C^{mb+mb'} \quad (32)$$

$$-C^{ma+ma'}C^{eb+eb'}\leq a_1 b_2 < C^{ma+ma'}C^{eb+eb'} \quad (33)$$

$$-C^{e_a+e_a'}C^{eb+eb'}< a_2 b_2 \leq C^{e_a+e_a'}C^{eb+eb'} \quad (34)$$

The formulas (32) to (34) can be rearranged to be expressed as the following formulas (35) to (37).

$$-C^{mb+e_a+mb'+e_a'}\leq a_2 b_1 < C^{mb+e_a+mb'+e_a'} \quad (35)$$

$$-C^{ma+eb+ma'+eb'}\leq a_1 b_2 < C^{ma+eb+ma'+eb'} \quad (36)$$

$$-C^{e_a+eb+e_a'+eb'}< a_2 b_2 \leq C^{e_a+eb+e_a'+eb'} \quad (37)$$

According to the following formula (38), the formula (31) is expressed as the following formula (39), and the extended digit satisfying the formula (40) is just to be determined.

$$C'=C^{mb+e_a+mb'+e_a'}+C^{ma+eb+ma'+eb'}+C^{e_a+eb+e_a'+eb'} \quad (38)$$

$$a_1 b_1-C'<A\times B<a_1 b_1+C' \quad (39)$$

$$C'\leq C^{\gamma+\gamma'} \quad (40)$$

In order to determine the extended digit, the minimum extended digit satisfying the following formula (41) is just to be determined.

$$C^{\alpha+\alpha'}+C^{\beta+\beta'}\leq C^{\gamma+\gamma'} \quad (41)$$

If the uncertain number $b_2$ of the real number B is 0, then the formula (38) becomes the following formula (42).

$$C^{\gamma+\gamma'}=C^{mb+e_a+mb'+e_a'} \quad (42)$$

If both the uncertain numbers of the real numbers A and B are 0, then $\gamma\to-\infty$, and the value of the absolute effective digit e is $-32768$ (1000000000000000). If the uncertain number of either of the real numbers A and B is 0, then the trimming processing of the lower digit is not performed.

(2) If $A>0$ and $B<0$, then $a_1 \leq C^{ma+ma'}$, $-b_1 \leq C^{mb+mb'}$, and the following formulas (43) to (45) are satisfied.

$$-C^{e_a+e_a'}C^{mb+mb'}< a_2 b_1 \leq C^{e_a+e_a'}C^{mb+mb'} \quad (43)$$

$$-C^{ma+ma'}C^{eb+eb'}\leq a_1 b_2 < C^{ma+ma'}C^{eb+eb'} \quad (44)$$

$$-C^{e_a+e_a'}C^{eb+eb'}< a_2 b_2 \leq C^{e_a+e_a'}C^{eb+eb'} \quad (45)$$

The formulas (43) to (45) can be rearranged to be expressed as the following formulas (46) to (48).

$$-C^{mb+e_a+mb'+e_a'}< a_2 b_1 \leq C^{mb+e_a+mb'+e_a'} \quad (46)$$

$$-C^{ma+eb+ma'+eb'}\leq a_1 b_2 < C^{ma+eb+ma'+eb'} \quad (47)$$

$$-C^{e_a+eb+e_a'+eb'}< a_2 b_2 \leq C^{e_a+eb+e_a'+eb'} \quad (48)$$

According to the following formula (49), the formula (31) is expressed as the following formula (50), and the extended digit satisfying the formula (51) is just to be determined.

$$C'=C^{mb+e_a+mb'+e_a'}+C^{ma+eb+ma'+eb'}+C^{e_a+eb+e_a'+eb'} \quad (49)$$

$$a_1 b_1-C'<A\times B<a_1 b_1+C' \quad (50)$$

$$C'\leq C^{\gamma+\gamma'} \quad (51)$$

The case of the uncertain number being 0 is the same as the case of (1) $A>0$ and $B>0$.

(3) If $A<0$ and $B>0$, then $-a_1 \leq C^{ma+ma'}$, $b_1 \leq C^{mb+mb'}$, and the following formulas (52) to (54) are satisfied.

$$-C^{e_a+e_a'}C^{mb+mb'}\leq a_2 b_1 < C^{e_a+e_a'}C^{mb+mb'} \quad (52)$$

$$-C^{ma+ma'}C^{eb+eb'}< a_1 b_2 \leq C^{ma+ma'}C^{eb+eb'} \quad (53)$$

$$-C^{e_a+e_a'}C^{eb+eb'}< a_2 b_2 \leq C^{e_a+e_a'}C^{eb+eb'} \quad (54)$$

The formulas (52) to (54) can be rearranged to be expressed as the following formulas (55) to (57).

$$-C^{mb+ea+mb'+ea'} \leq a_2 b_1 < C^{mb+ea+mb'+ea'} \quad (55)$$

$$-C^{ma+eb+ma'+eb'} < a_1 b_2 \leq C^{ma+eb+ma'+eb'} \quad (56)$$

$$-C^{ea+eb+ea'+eb'} < a_2 b_2 \leq C^{ea+eb+ea'+eb'} \quad (57)$$

According to the following formula (58), the formula (31) is expressed as the following formula (59), and the extended digit satisfying the formula (60) is just to be determined.

$$C' = C^{mb+ea+mb'+ea'} + C^{ma+eb+ma'+eb'} + C^{ea+eb+ea'+eb'} \quad (58)$$

$$a_1 b_1 - C' < A \times B < a_1 b_1 + C' \quad (59)$$

$$C' \leq C^{r+r'} \quad (60)$$

The case of the uncertain number being 0 is the same as the case of (1) A>0 and B>0.

(4) If A<0 and B<0, then $a_1 \leq C^{ma+ma'}$, $-b_1 \leq C^{mb+mb'}$, and the following formulas (61) to (63) are satisfied.

$$-C^{ea+ea'}C^{mb+mb'} < a_2 b_1 \leq C^{ea+ea'}C^{mb+mb'} \quad (61)$$

$$-C^{ma+ma'}C^{eb+eb'} < a_1 b_2 \leq C^{ma+ma'}C^{eb+eb'} \quad (62)$$

$$-C^{ea+ea'}C^{eb+eb'} < a_2 b_2 \leq C^{ea+ea'}C^{eb+eb'} \quad (63)$$

The formulas (61) to (63) can be rearranged to be expressed as the following formulas (64) to (66).

$$-C^{mb+ea+mb'+ea'} < a_2 b_1 \leq C^{mb+ea+mb'+ea'} \quad (64)$$

$$-C^{ma+eb+ma'+eb'} < a_1 b_2 \leq C^{ma+eb+ma'+eb'} \quad (65)$$

$$-C^{ea+eb+ea'+eb'} < a_2 b_2 \leq C^{ea+eb+ea'+eb'} \quad (66)$$

According to the following formula (67), the formula (31) is expressed as the following formula (68), and the extended digit satisfying the formula (69) is just to be determined.

$$C' = C^{mb+ea+mb'+ea'} + C^{ma+eb+ma'+eb'} + C^{ea+eb+ea'+eb'} \quad (67)$$

$$a_1 b_1 - C' < A \times B \leq a_1 b_1 + C' \quad (68)$$

$$C' < C^{r+r'} \quad (69)$$

The case of the uncertain number being 0 is the same as the case of (1) A>0 and B>0.

Division

Assume that a real number A and a real number B are the high-precision computer numbers defined by the formulas (11) and (12), respectively.

$$A = a_1 + a_2, |a_1| \leq C^{ha+ha'}, -C^{ea+ea'} \leq a_2 < C^{ea+ea'} \quad (11)$$

$$B = b_1 + b_2, |b_1| \leq C^{hb+hb'}, -C^{eb+eb'} \leq b_2 < C^{eb+eb'} \quad (12)$$

Herein $a_1$ and $b_1$ are definite numbers whose numerical values are definite, and $a_2$ and $b_2$ are uncertain numbers whose numerical values are uncertain; C=2; $h_a$+ha and $h_b$+$h_b$' respectively denote extended high order maxes that are minimum extended digits satisfying $|a_1| \leq 2^{ha+ha'}$ and $|b_1| \leq 2^{hb+hb'}$; $h_a$ and $h_b$ respectively denote high order maxes that are integers, $h_a$' and $h_b$' respectively denote decimal digits that are $h_a$'/256 and $h_b$'/256; $e_a+e_a$' and $e_b+e_b$' denote extended absolute effective digits; $e_a$ and $e_b$ denote absolute effective digits that are integers; and $e_a$' and $e_b$' respectively denote decimal digits which are decimals of $e_a$'/256 and $e_b$'/256.

For B/A, $h_a+h_a'-1/256$ and $h_b+h_b'-1/256$ are used instead of the extended high order max ($h_a+h_a'$, $h_b+h_b'$), and the high-precision computer number is defined by the following formulas (71) and (72).

$$A = a_1 + a_2, |a_1| > C^{h_a+h'_a - \frac{1}{256}}, \quad (71)$$
$$-C^{e_a+e'_a} \leq a_2 < C^{e_a+e'_a}$$

$$B = b_1 + b_2, |b_1| > C^{h_b+h'_b - \frac{1}{256}}, \quad (72)$$
$$-C^{e_b+e'_b} \leq b_2 < C^{e_b+e'_b}$$

B/A is expressed by the following formula (73).

$$\frac{B}{A} = \frac{b_1+b_2}{a_1+a_2} = \frac{b_1}{a_1} + \frac{b_2 a_1 - b_1 a_2}{a_1(a_1+a_2)} \quad (73)$$

The formula (73) is evaluated.

$$|a_1(a_1+a_2)| > C^{h_a+h'_a - \frac{1}{256}}\left(C^{h_a+h'_a - \frac{1}{256}} - C^{e_a+e'_a}\right) \quad (74)$$

This formula (74) assumes that $C^{h_a+h_a'-1/256} - C^{e_a+e_a'}$ will not be 0. A value less than or equal to 0 means a possibility of A being 0, so division does not hold.

$$C^{h_a+h'_a - \frac{1}{256}} - C^{e_a+e'_a} \geq C^{H_a+H_{a'}} \quad (75)$$

Determining the extended digit ($H_a+H_a$') satisfying the formula (75) results in the following formula (76). $H_a+H_a$' can be determined by referring to an extended digit subtraction table which outputs the maximum extended digit ($\gamma+\gamma$') satisfying $C^{\alpha'} - C^{\beta+\beta'} \geq C^{\gamma+\gamma'}$ for $C^{\alpha'}$ and $C^{\beta+\beta'}$.

$$|a_1(a_1+a_2)| > C^{h_a+h'_a - \frac{1}{256}} C^{H_a+H_{a'}} \quad (76)$$

$$a_1(a_1+a_2) > C^{(H_a+h_a)+\left(H'_a+h_{a'} - \frac{1}{256}\right)}$$

$$\frac{1}{a_1(a_1+a_2)} < C^{-(H_a+h_a)+\left(H'_a+h_{a'} - \frac{1}{256}\right)}$$

Next, $b_2 a_1 - b_1 a_2$ is evaluated for each terms. If $a_1>0$, then the following formula (77) holds; if $a_1<0$, then the following formula (78) holds; if $b_1>0$, then the following formula (79) holds; and if $b_1<0$, then the following formula (80) holds.

$$a_1>0, -C^{eb+eb'}a_1 \leq b_2 a_1 < C^{eb+eb'}a_1 - C^{eb+eb'}$$
$$C^{ha+ha'} < b_2 a_1 < C^{eb+eb'}C^{ha+ha'} \quad (77)$$

$$a_1<0, C^{eb+eb'}a_1 < b_2 a_1 \leq -C^{eb+eb'}a_1 - C^{eb+eb'}$$
$$C^{ha+ha'} < b_2 a_1 < C^{eb+eb'}C^{ha+ha'} \quad (78)$$

$$b_1>0, -C^{ea+ea'}b_1 \leq b_1 a_2 < C^{ea+ea'}b_1 - C^{ea+ea'}$$
$$C^{hb+hb'} < -b_1 a_2 < C^{ea+ea'}C^{hb+hb'} \quad (79)$$

$$b_1<0, C^{ea+ea'}b_1 < b_1 a_2 \leq -C^{ea+ea'}b_1 - C^{ea+ea'}C^{hb+hb'} < -$$
$$b_1 a_2 < C^{ea+ea'}C^{hb+hb'} \quad (80)$$

Therefore, if $a_1>0$ and $b_1>0$, then the following formula (81) holds; if $a_1>0$ and $b_1<0$, then the following formula (82) holds; if $a_1<0$ and $b_1>0$, then the following formula (83) holds; and if $a_1<0$ and $b_1<0$, then the following formula (84) holds.

$$a>0, b_1>0, -C^{eb+eb'}C^{ha+ha'} - C^{ea+ea'}C^{hb+hb'} < b_2 a_1 -$$
$$b_1 a_2 < C^{eb+eb'}C^{ha+ha'} + C^{ea+ea'}C^{hb+hb'} \quad (81)$$

$$a>0, b_1<0, -C^{eb+eb'}C^{ha+ha'} - C^{ea+ea'}C^{hb+hb'} < b_2 a_1 -$$
$$b_1 a_2 < C^{eb+eb'}C^{ha+ha'} + C^{ea+ea'}C^{hb+hb'} \quad (82)$$

$$a<0, b_1>0, -C^{eb+eb'}C^{ha+ha'} - C^{ea+ea'}C^{hb+hb'} < b_2 a_1 - b_1 a_2 < C^{eb+eb'}C^{ha+ha'} + C^{ea+ea'}C^{hb+hb'} \quad (83)$$

$$a<0, b_1<0, -C^{eb+eb'}C^{ha+ha'} - C^{ea+ea'}C^{hb+hb'} < b_2 a_1 - b_1 a_2 < C^{eb+eb'}C^{ha+ha'} + C^{ea+ea'}C^{hb+hb'} \quad (84)$$

$$C^{eb+eb'}C^{ha+ha'} + C^{ea+ea'}C^{hb+hb'} = C^{ha+eb+ha'+eb'} + C^{hb+ea+hb+ea'} \leq C^{Hab+ab'} \quad (85)$$

Determining the extended digit $(H_{ab}+H_{ab}')$ satisfying the formula (85) results in the following formula (86).

$$-C^{Hab+Hab'} < b_2 a_1 - b_1 a_2 < C^{Hab+Hab'} \quad (86)$$

Therefore, the second term of the formula (73) can be denoted by the following formula (87).

$$-C^{Hab+Hab'}C^{-(H_a+h_a)-(H_{a'}+h_{a'}-\frac{1}{256})} < $$

$$\frac{b_2 a_1 - b_1 a_2}{a_1(a_1+a_2)} < C^{Hab+Hab'}C^{-(H_a+h_a)-(H_{a'}+h_{a'}-\frac{1}{256})} \quad (87)$$

$$-C^{(Hab+H_a-h_a)+(H_{ab'}-H_{a'}-h_{a'}+\frac{1}{256})} < \frac{b_2 a_1 - b_1 a_2}{a_1(a_1+a_2)} < $$

$$C^{(Hab+H_a-h_a)+(H_{ab'}-H_{a'}-h_{a'}+\frac{1}{256})}$$

Next, the digit of $b_1/a_1$ will be described. Since the digit of $b_1/a_1$ can be rounded to the difference from which the extended digit $(H_a+H_a')$ satisfying the formula (85) is obtained in the arithmetic operation of the uncertain part, the digits up to the rounding error is just to be determined. The rounding will be described using the following formulas (88) to (90).

$$-C^{-(H_a+h_a)-(H_{a'}+h_{a'}-\frac{1}{256})}(C^{h_a+e_b+h_{a'}+e_{b'}} + C^{h_b+e_a+h_{b'}+e_{a'}}) < \quad (88)$$

$$\frac{b_2 a_1 - b_1 a_2}{a_1(a_1+a_2)} < $$

$$C^{-(H_a+h_a)-(H_{a'}+h_{a'}-\frac{1}{256})}(C^{h_a+e_b+h_{a'}+e_{b'}} + C^{h_b+e_a+h_{b'}+e_{a'}})$$

$$C^{-(H_a+h_a)-(H_{a'}+h_{a'}-\frac{1}{256})}(C^{h_a+e_b+h_{a'}+e_{b'}} + C^{h_b+e_a+h_{b'}+e_{a'}}) = \quad (89)$$

$$C^{(e_b-H_a)+(e_{b'}-H_{a'}+\frac{1}{256})} + C^{(h_b+e_a-H_a-h_a)+(h_{b'}+e_{a'}-H_{a'}-h_{a'}+\frac{1}{256})}$$

$$C^{(e_b-H_a)+(e_{b'}-H_{a'}+\frac{1}{256})} + C^{(h_b+e_a-H_a-h_a)+(h_{b'}+e_{a'}-H_{a'}-h_{a'}+\frac{1}{256})} + \varepsilon = \quad (90)$$

$$C^{(Hab-H_a-h_a)+(H_{ab'}-H_{a'}-h_{a'}+\frac{1}{256})}$$

According to the formula (90), the digits after c can be rounded.

Next, a description will be given of a process when the uncertain number is 0, that is, when $e_a$ and $e_b$ are $-\infty$.

(1) If $e_a = -\infty$ then, in the formula (74) for evaluating the above formula (73), determining the extended digit $(H_a+H_a')$ satisfying the formula (75) results in the following formula (91).

$$(H_{CL}+H_{a'}) = \left(h_a + h_{a'} - \frac{1}{256}\right) \quad (91)$$

Further, determining the extended digit $(H_{ab}+H_{ab}')$ satisfying the formula (85) results in the following formula (92).

$$(H_{ab}+H_{ab}') = (h_a + e_b + h_{a'} + e_{b'}) \quad (92)$$

Therefore, according to the formula (93), the inequality of the formula (88) is rewritten as the formula (94).

$$C^{(e_b-H_a)+(e_{b'}-H_{a'}+\frac{1}{256})} + C^{(h_b+e_a-H_a-h_a)+(h_{b'}+e_{a'}-H_{a'}-h_{a'}+\frac{1}{256})} = \quad (93)$$

$$C^{(e_b-H_a)+(e_{b'}-H_{a'}+\frac{1}{128})}$$

$$-C^{(e_b-H_a)+(e_{b'}-H_{a'}+\frac{1}{128})} < \frac{b_2 a_1 - b_1 a_2}{a_1(a_1+a_2)} < C^{(e_b-H_a)+(e_{b'}-H_{a'}+\frac{1}{128})} \quad (94)$$

In the formula (94), the formula (95) and the formula (96) are used. Then, using the difference between $C^{\alpha+\alpha'}$ and $C^{\beta+\beta'}$, trimming processing of the extended absolute effective digit is performed.

$$(\alpha + \alpha^J) = (e_l, -h_a) + \left(e_{b'}, -h_{a'} + \frac{1}{128}\right) \quad (95)$$

$$(\beta + \beta\prime) = \left(\alpha + \alpha\prime + \frac{1}{256}\right) \quad (96)$$

FIG. 28 illustrates a position of a definite number $(b_1/a_1)$ in division of high-precision computer numbers. $b_1/a_1$ is approximated at $\varepsilon = C^{\beta+\beta'} - CC^{\alpha+\alpha'}$ or less. The specific value of $\varepsilon$ is obtained as the value of $\inf C^{\beta+\beta'} - \sup C^{\alpha+\alpha'}$. If $\alpha' \leq 137$, then the offset value is 9, and if $\alpha' > 137$, then the offset value is 8.

If $e_b = -\infty$, then the error is zero. Therefore, it is necessary to specify the effective digit from the outside.

(2) If $e_a \neq -\infty$, $e_b = -\infty$, then determining the extended digit $(H_{ab}+H_{ab}')$ satisfying the formula (85) results in the following formula (97).

$$(H_{ab}+H_{ab}') = (h_b + e_a + h_b + e_{a'}) \quad (97)$$

Therefore, according to the formula (98), the inequality of the formula (88) is rewritten as the formula (99).

$$C^{(e_b-H_a)+(e_{b'}-H_{a'}+\frac{1}{256})} + C^{(h_b+e_a-H_a-h_a)+(h_{b'}+e_{a'}-H_{a'}-h_{a'}+\frac{1}{256})} = \quad (98)$$

$$C^{(h_b+e_a-H_a-h_a)+(h_{b'}+e_{a'}-H_{a'}-h_{a'}+\frac{1}{256})}$$

$$-C^{(h_b+e_a-H_a-h_a)+(h_{b'}+e_{a'}-H_{a'}-h_{a'}+\frac{1}{256})} < \quad (99)$$

$$\frac{b_2 a_1 - b_1 a_2}{a_1(a_1+a_2)} < C^{(h_b+e_a-H_a-h_a)+(h_{b'}+e_{a'}-H_{a'}-h_{a'}+\frac{1}{256})}$$

Then, as in the case of (1) $e_a = -\infty$, the trimming process of the extended absolute effective digit is performed by using the difference between $C^{\alpha+\alpha'}$ and $C^{\beta+\beta'}$.

Extended Digit Subtraction Table

An extended digit subtraction table for outputting the maximum extended digit $(\gamma+\gamma')$ satisfying $C^{\alpha'} - C^{\beta+\beta'} \geq C^{\gamma+\gamma'}$ for $C^{\alpha'}$ and $C^{\beta+\beta'}$ will be described. Herein, $0 \geq \beta$, and $\alpha'$ and $\beta'$ are $\alpha'/2^8$ and $\beta'/2^8$, respectively. If $0 = \beta$, then $\alpha' \geq \beta'$. By using the extended digit subtraction table, the arithmetic operation can be accelerated, for example, in determining the extended digit $(H_a+H_a')$ satisfying the formula (75).

Figure 29:
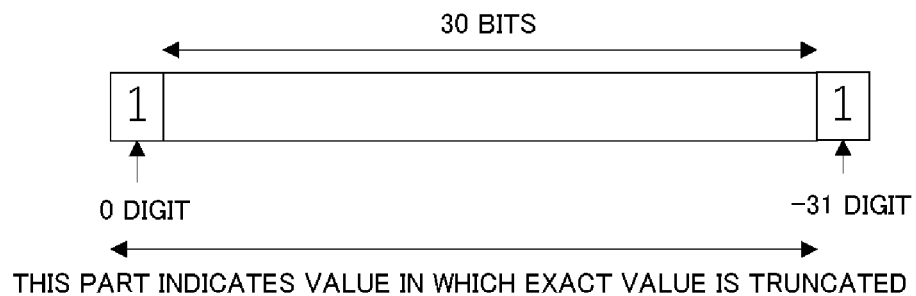
FIG. 29 illustrates an example of a 32 bit representation of A when $C^{\alpha'}=A+B$ (A: definite number, B: uncertain number).

FIG. 29 illustrates an example of a 32 bit representation of A when $C^{\alpha'} = A+B$ (A: definite number, B: uncertain number). The range of B is $-C^{-31} \leq B < C^{-31}$. Herein, $\alpha'$ is $\alpha'/2^8$. Then, the maximum extended digit of $C^{\gamma+\gamma'}$ including the minimum possible value of $C^{\alpha'} + C^{\beta+\beta'}$ is determined. Specifically, $C^{\gamma+\gamma'}$ satisfying $\inf C^{\alpha'} - \sup C^{\beta} + \beta' \geq \sup C^{\gamma+\gamma'}$ is determined. Further, the difference $(\sup C^{\gamma+\gamma'} - (\inf C^{\alpha'} - \sup C^{\beta+\beta'}))$ is calculated.

If $\beta = 0$ and $\alpha' = \beta'$, then $C^{\alpha'} - C^{\beta+\beta'} \geq C^{-\infty}$. Possible values of $\gamma$ are a range of single-precision integers, and the smallest value is treated as $-\infty$. The value is "1000000000000000" in a 2 bit representation.

Figure 30:
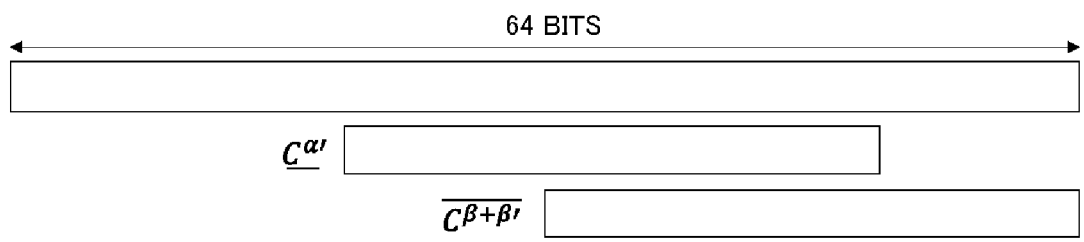
FIG. 30 illustrates a specific method for calculating $infC^{\alpha'}-supC^{\beta+\beta'}$.

FIG. 30 illustrates a specific method for calculating $infC^{\alpha'}-supC^{\beta+\beta'}$. $infC^{\alpha'}$ and $supC^{\beta+\beta'}$ are expressed by 32 bits, the least significant bit of the $supC^{\beta+\beta'}$ is matched with the least significant bit of the 64 bits, and the arithmetic operation is performed with the unsigned 64 bit integer. This processing does not exceed the range of 64 bits. $infC^{\alpha'}$ and $supC^{\beta+\beta'}$ are copied to 64 bits and $infC^{\alpha'}$ is shifted to the left by −0 bits. Then, the difference between these values is calculated. In the arithmetic operation of the difference, the first non-0 bit is determined, and the most significant bit of $supC^{\gamma}$ is aligned with the bit.

3. Specific Examples

An example of arithmetic operation using the high-precision computer number will be described below. The radix is 2 (C=2), and extensions (decimal part) of the exponents $h_a'$, $h_b'$, $e_a'$, $e_b'$, and r' are $h_a'/2^8$ ($0 \le h_a' < 2^8$), $h_b'/2^8$ ($0 \le h_b' < 2^8$), $e_a'/2^8$ ($0 \le e_a' < 2^8$), $e_b'/2^8$ ($0 \le e_b' < 2^8$), and $r'/2^8$ ($0 \le r' < 2^8$), respectively.

In the arithmetic operation examples, double precision floating-point representations were converted into high-precision computer numbers, and arithmetic operations were performed using the high-precision computer numbers. The conversion of a double precision floating-point representation into a high-precision computer number is performed by checking the sign and exponent of the double precision floating-point representation and copying the significand.

Figure 31:
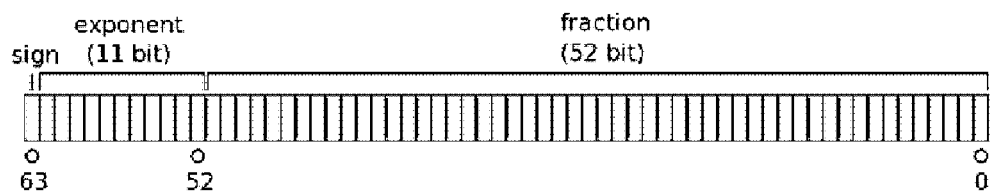
FIG. 31 illustrates a double precision floating-point representation.

FIG. 31 illustrates a double precision floating-point representation, and FIG. 32 illustrates an example of a bit representation of decimal number "0.1" with a high-precision computer number. In the high-precision computer number shown in FIG. 32, sign (0) indicates a positive number, and An (2) indicates that the number of used 32 bit arrays is "2". h (−4) indicates that the high order max is "−4", and h' (174) indicates that the extension (decimal part) of the high order max is "174". 1 (55) indicates that the least significant bit of the array a [0] is −55th digit in the binary notation.

e (−57) indicates that the effective digit is valid up to −57th digit in the binary notation. This is represented as $\log_{10} 2 = 0.301029995663981\ldots$ in the decimal notation, so that $\log_{10} 2^{-57} = -17.1587097528469281\ldots$, which means up to −17 digits in the decimal notation are valid (see line 4 in FIG. 32).

To the arrays a [1] and a [0], the significand (fraction) of the double precision floating-point representation is directly substituted. It should be noted that the high-precision computer number is right-aligned. Since the value of "0.1" in the decimal notation cannot be exactly expressed in a computer, it is represented as the value in line 4.

Substituting the significand denoting "0.1" in the decimal notation in double precision floating-point representation into the array of the high-precision computer number, the following array (A) is obtained. This is a concatenation of the array a [1] and the array a [0] of the high-precision computer number shown in FIG. 33.

00000000000011001100110011001100 11001100110011001100110011001101 (A)

The first 1 bit is the high order max h and can be computed from the double precision floating-point representation. The extension (decimal digit) h' of the high order max can be determined by referring to the above-mentioned extended digit table. The first 9 bits of the array (A) are "110011001" and the following 8 bits are "10011001". By using these 8 bits, the extension h' of the high order max can be determined by referring to the above-mentioned "8 bit-α' table".

Since "10011001" is 153 in the decimal notation, the 153rd value (174) of the "8 bit-α' table" (the first value is 0th) is read.

$2^{174/256}$ is calculated as 1.60179275568269335379384624159 1. On the other hand, the value of the first 32 bits of the array (A) is 3435973836, and by dividing this value by $2^{31}$, the first bit of the array (A) can be defined as 0th digit of the binary notation. It is understood that, since this value is 1.5999999996274709701538085937 5, setting the first 1 digit of the array (A) to be the 0th digit of the binary notation can suppress the array (A) to $2^{174/256}$. Since the beginning of the array (A) is −4th digit in the binary notation, $0.1 \le 2^{-4+174/256}$ is satisfied.

When actually calculated, the following arithmetic operation results are obtained, and it is found that $2^{-4+173/256} \le 0.1 \le 2^{-4+174/256}$.

$2^{-4+174/256} = 0.10011204723016833461211539009943$ $2^{-4+173/256} = 0.09984134986928919364142626838804$

Addition

FIG. 33 illustrates an example of a bit representation of decimal number "1.1" with a high-precision computer number, and FIG. 34 illustrates an example of the result of calculating "0.1+1.1" by using high-precision computer numbers after converting decimal numbers "0.1" and "1.1" to high-precision computer numbers.

In the high-precision computer number shown in FIG. 34, h (0) and h' (68) indicate $1.2 \le 2^{68/256}$. When actually calculated, the following arithmetic operation results are obtained, and it is found that $2^{67/256} \le 0.1 \le 2^{68/256}$.

$2^{67/256} = 1.19890616707438048177\ldots$ $2^{68/256} = 1.20215673145270314 20\ldots$ The extended absolute effective digits e (−53) and e' (23) of the arithmetic operation result indicate that the extended absolute effective digits e (−57) and e' (0) of the high-precision computer number of "0.1" and the extended absolute effective digits e (−53) and e' (0) of the high-precision computer number of "1.1" are used and that $2^{-53+22/256} \le 2^{-57}+2^{-53} \le 2^{-53+23/256}$. Multiplying both sides by $2^{53}$ yields the following arithmetic operation result, to reveal that $2^{22/256} \le 2^{-4}+1 \le 2^{23/256}$.

$2^{22/256} = 1.061377227289262\ldots$ $2^{-4}+1 = 1.0625$ $2^{23/256} = 1.0642549128844645\ldots$ Next, the offset value is determined.

$0.1 = 0.1000000000000000055511151231 2+\alpha |\alpha| \le 2^{-57}$ $1.1 = 1.10000000000000000888178419700+\beta |\beta| \le 2^{-53}$ $1.2 = 1.20000000000000009436895709312+\alpha+\beta$ Since $\alpha+\beta \le 2^{-57}+2^{-53} = 2^{-53}(2^{-4}+1)$, the minimum γ' satisfying $(1+2^{-4}) \le 2^{\gamma'/256}$ is determined. In $(1+2^{-4})$, $1=2^0$, $2^{-4}=2^{-4}$, α'=0, β=−4, and β'=0, so that γ' and the digits of the difference (offset value) are obtained from these values by referring to the above-mentioned extended digit addition table.

Using the value (γ'=23) in the extended digit addition table, $(1+2^{-4}) \leq 2^{23/256}$; actual calculation of both sides yields the following arithmetic operation result.

$$1+2^{-4}=1.0625$$

$$2^{23/256}=1.06425491288446454978861125700016$$

The offset value of the extended digit addition table is 10. The arithmetic operation result of the difference is as follows.

$$2^{23/256}-(1+2^{-4})$$
$$=0.00175491288446454978861125700158$$

The arithmetic operation result obtained by multiplying this by $2^{10}$ is as follows. 1.79703079369169898835379271696181

Digits after the decimal point in the binary notation are "0.0000000001*******", and the part of "1*******" or less can be truncated. This indicates that 10 digits or less from −53rd digit in the binary notation may be truncated. Thus, the low order max l is −55th digit, which does not exceed the absolute effective digit e (−53). Originally, −55th digits or less in the binary notation are 0s.

FIG. 35 illustrates an example of the result of calculating decimal number multiplication "0.1*1.1" in the floating-point format and converting the product to a high-precision computer number. It can be seen that the accuracy is somewhat improved when the arithmetic operation is performed after converting into the high-precision computer number.

FIG. 36 illustrates an example of a bit representation of a decimal number "0.0000001" with a high-precision computer number, and FIG. 37 illustrates an example of a bit representation of a decimal number "1.0" with a high-precision computer number. FIG. 38 illustrates an example of the result of converting decimal numbers "0.0000001" and "1.0" into high-precision computer numbers and then adding "0.0000001" one hundred times to "1.0" by using high-precision computer numbers. It can be seen that the absolute effective digit e (−53) does not change and only the decimal digit e' becomes 100.

In the iterative arithmetic operation of computer numbers according to the first embodiment, since the value of the absolute effective digit e is increased by about 3 for each arithmetic operation, the significance of the effective digit is lost when the arithmetic operations are performed 100 times, but this can be improved by the high-precision computer number.

FIG. 39 illustrates an example of the result of adding "0.0000001" one hundred times to "1.0" in the floating-point format and converting the result into a high-precision computer number. The number of effective digit is 15 in the decimal notation.

Multiplication

FIG. 40 illustrates an example of the result of converting decimal numbers "0.1" and "1.1" to high-precision computer numbers and calculating "0.1*1.1" by using high-precision computer numbers.

In the high-precision computer number shown in FIG. 40, h (−4) and h' (209) denote $0.11 \leq 2^{-4+209/256}$. When actually calculated, the following arithmetic operation results are obtained, and it is found that $2^{-4+208/256} \leq 0.11 \leq 2^{-4+209/256}$.

$$2^{-4+208/256}=0.1097657600233312\ldots$$

$$2^{-4+209/256}=0.11006336518984898\ldots$$

In the high-precision computer number shown in FIG. 40, e (−56) and e' (112) indicate that $2^{57} C' \leq 2^{57} (2^{-56+112/256})$. A specific arithmetic operation result of C' shown in the formula (38) when both A and B are positive is as follows.

$$C'=C^{mb+e_a+mb'+e_a'}+C^{ma+eb+ma'+eb'}+C^{e_a+eb+e_a'+eb'} \quad (38)$$

$$C'=2^{0-57+36/256+0}+2^{-4-53+174/256+0}+2^{-57-53+0+0}$$

$$C'=2^{-57+36/256}+2^{-57+174/256}+2^{-110}$$

$$2^{57}C'=2^{36/256}+2^{174/256}+2^{-53}$$

When actually calculated, the following arithmetic operation results are obtained, and it is found that $2^{57}$ $(2^{-56+111/256}) \leq 2^{57} C' \leq 2^{57} (2^{-56+112/256})$. It can be also seen that e (−56) and e' (112) are the minimum extended digits satisfying $C' \leq C^{\gamma+\gamma'}$, and are the extended effective digits (e+e'/256).

$$2^{57}(2^{-56+112/256})=2.708511093873\ldots$$

$$2^{57}C'=2.704175338990\ldots$$

$$2^{57}(2^{-56+111/256})=2.701187431\ldots$$

Since the offset value is 9, the low order max l is (−63), which is smaller than e (−56). It is assumed that two or more 0s are consecutive after this digit.

FIG. 41 illustrates an example of the result of calculating decimal number multiplication "0.1*1.1" in the floating-point format and converting the product to a high-precision computer number. It can be seen that the arithmetic operation result by the high-precision computer number is similar to the arithmetic operation result by the floating-point number.

FIG. 42 illustrates an example of the result of multiplication in which "1.1" is multiplied by "0.0000001" one hundred times with high-precision computer numbers.

The effective digits are compared between the arithmetic operation result shown in FIG. 42 and the high-precision computer number of "1.1" shown in FIG. 33. The effective digit is the smallest integer that satisfies $\log_C$|definite number|−extended absolute effective digit $(\gamma+\gamma') \leq k$.

FIG. 33: (0+36/256)−(−53)=53+36/256

FIG. 42: (−2326+202/256)−(−2372+1/256)=43+203/256

Although the effective digit is reduced by about 6+89/256, they are improved compared with the computer numbers in the first embodiment.

Division

FIG. 43 illustrates an example of the result of converting decimal numbers "1 and" 3 to high-precision computer numbers and then using high-precision computer numbers to calculate "1/3". Since 1 and 3 have no uncertain number part ($e_a=-\infty$, $e_b=-\infty$), the extended absolute effective digit was specified as −100.

FIG. 44 illustrates an example of a bit representation of a denominator of decimal number "0.1" with a high-precision computer number, and FIG. 45 illustrates an example of a bit representation of a numerator of decimal number "1" with a high-precision computer number. FIG. 46 illustrates an example of the result of calculating "1/0.1" by using high-precision computer numbers. Since 1 has no uncertain number part, the arithmetic operation is performed as the case where the uncertain number of the numerator is 0 ($e_a \neq -\infty$, $e_b = -\infty$).

$$C^{h_a+h_a'-\frac{1}{256}} - C^{e_a+e_a'} \geq C^{H_a+H_a'} \quad (75)$$

In the above formula (75), $h_a+h_a'-1/256$, $e_a+e_a'$ are calculated as follows.

$$h_a+h_a'-1/256 = -4+173/256$$

$$e_a+e_a' = -57$$

Then, these numerical values are used to calculate $H_a+H_a$ by referring to the extended digit subtraction table. Because $e_a$ is smaller than ha, the value is obtained by subtracting 1/256 from $h_a+h_a-1/256$.

$$H_a+H_a' = -4+172/256$$

$$-C^{(h_b+e_a-H_a-h_a)+(h_{b'}+e_{a'}-H_{a'}-h_{a'}+\frac{1}{256})} < \quad (99)$$

$$\frac{b_2a_1-b_1a_2}{a_1(a_1+a_2)} < C^{(h_b+e_a-H_a-h_a)+(h_{b'}+e_{a'}-H_{a'}-h_{a'}+\frac{1}{256})}$$

In the above formula (99), $(h_b+e_a-H_a-h_a)+(h_b'+e_a'-H_a'-h_a'+1/256)$ is $-51+168/256$, which is the arithmetic operation result of the extended absolute effective digits e (−51) and e' (169). Since the offset value is 8, the extended absolute effective digit is larger than the low order max l (−53).

FIG. 47 illustrates an example of a bit representation of a denominator of decimal number "0.1" with a high-precision computer number, and FIG. 48 illustrates an example of a bit representation of a numerator of decimal number "0.2" with a high-precision computer number. FIG. 49 illustrates an example of the result of calculating "0.2/0.1" by using high-precision computer numbers. The arithmetic operation is carried out as the case that the uncertain numbers of the numerator and the denominator are not 0 ($ea \neq -\infty$, $eb \neq -\infty$).

$$C^{h_a+h_a'-\frac{1}{256}} - C^{e_a+e_a'} \geq C^{H_a+H_a'} \quad (75)$$

In the above formula (75), $h_a+h_a'-1/256$ and $e_a+e_a'$ are calculated as follows.

$$h_a+h_a'-1/256 = -4+173/256$$

$$e_a+e_a' = -57$$

Then, these numerical values are used to calculate $H_a+H_a'$ by referring to the extended digit subtraction table. Because $e_a$ is smaller than ha, the value is obtained by subtracting 1/256 from $h_a+h_a'-1/256$.

$$H_a+H_a' = -4+172/256$$

$$-C^{-(H_a+h_a)-(H_{a'}+h_{a'}-\frac{1}{256})}(C^{h_a+e_b+h_{a'}+e_{b'}} + C^{h_b+e_a+h_{b'}+e_{a'}}) < \quad (88)$$

$$\frac{b_2a_1-b_1a_2}{a_1(a_1+a_2)} <$$

$$C^{-(H_a+h_a)-(H_{a'}+h_{a'}-\frac{1}{256})}(C^{h_a+e_b+h_{a'}+e_{b'}} + C^{h_b+e_a+h_{b'}+e_{a'}})$$

$$C^{-(H_a+h_a)-(H_{a'}+h_{a'}-\frac{1}{256})}(C^{h_a+e_b+h_{a'}+e_{b'}} + C^{h_b+e_a+h_{b'}+e_{a'}}) = \quad (89)$$

$$C^{(e_b-H_a)+(e_{b'}-H_{a'}+\frac{1}{256})} + C^{(h_b+e_a-H_a-h_a)+(h_{b'}+e_{a'}-H_{a'}-h_{a'}+\frac{1}{256})}$$

In the above formula (89), the following two values of the exponent are calculated.

$$(e_b-H_a)+(e_{b'}-H_{a'}+1/256) = -53+85/256$$

$$(h_b+e_a-H_a-h_a)+(h_b'+e_a'-H_a'-h_a'+1/256) = -53+85/256$$

Since there is no difference between these two values, in the method in which the offset value is ∞, the extended absolute effective digit of the arithmetic operation result is −52+85/256 plus 1/256 (e (−52), e' (86)).

DESCRIPTION OF REFERENCE CHARACTERS

11 input unit, 12 storage unit, 13 arithmetic unit, 14 control unit, 21 CPU, 22 GPU, 23 ROM, 24 RAM, 25 operation input unit, 26 storage, 27 input/output interface, 31 input unit, 32 storage unit, 33 arithmetic unit, 34 control unit

What is claimed is:

1. An information processing apparatus comprising:
a memory configured to store a high-precision computer number in which real numbers A and B are respectively defined by the following formulas (11) and (12); and
a processor programmed to:
input the high-precision computer number in bit representation into the memory;
perform an arithmetic operation by using definite numbers $a_1$ and $b_1$ of the high-precision computer numbers stored in the memory, and by assuming that real numbers A and B fall within a range of $a_1-C^{ea+ea'} \leq A < a_1+C^{ea+ea'}$ and $b_1-C^{eb+eb'}$, respectively;
determine an extended absolute effective digit ($\gamma+\gamma'$) so as to satisfy the following formula (13); and
instruct the memory to store high-precision computer numbers as the result of the arithmetic operation, $$A = a_1+a_2, |a_1| \leq C^{h_a+h_a'}, -C^{e_a+e_a'} \leq a_2 < C^{e_a+e_a'} \quad (11)$$

$$B = b_1+b_2, |b_1| \leq C^{h_b+h_b'}, -C^{e_b+e_b'} \leq b_2 < C^{e_b+e_b'} \quad (12)$$

$$(A,B) = (a,b)_1+(a,b)_2, -C^{\gamma+\gamma'} \leq (a,b)_2 < C^{\gamma+\gamma'} \quad (13)$$

wherein $a_1$ and $b_1$ are definite numbers whose numerical values are definite, and $a_2$ and $b_2$ are uncertain numbers whose numerical values are uncertain; C denotes a radix; $h_a+h_a'$ and $h_b+h_b'$ respectively denote extended high order maxes that are minimum extended digits satisfying $|a_1| \leq C^{h_a+h_a'}$ and $|b_1| \leq C^{h_b+h_b'}$; $h_a$ and $h_b$ respectively denote high order maxes that are integers; $h_a'$ and $h_b'$ respectively denote decimal digits that are decimals of $0 \leq h_a' < 1$ and $0 \leq h_b' < 1$; $e_a+e_a'$, $e_b+e_b'$, and $\gamma+\gamma'$ denote extended absolute effective digits that are extended digits; $e_a$, $e_b$, and $\gamma$ denote absolute effective digits that are integers; $e_a'$, $e_b'$, and r' respectively denote decimal digits that are decimals of $0 \leq e_a' < 1$, $0 \leq e_b' < 1$, and $0 \leq r' < 1$; (A, B) is the arithmetic operation result of the real numbers A and B; (a, b)$_1$ is the arithmetic operation result of the definite numbers $a_1$ and $b_1$; and (a, b)$_2$ is the arithmetic operation result of the uncertain numbers $a_2$ and $b_2$; and
wherein a sign s, a high order max h, a high order max sub h', a low order max l, an absolute effective digit e, an absolute effective digit sub e', and a number of array a are input, a predetermined number of bit arrays in the memory are secured based on the high order max h and a least significant digit l, and the high-precision computer number is stored in the memory in bit representation.

2. The information processing apparatus according to claim 1, wherein the radix C of the high-precision computer number is any one of 2, 8, and 16.

3. The information processing apparatus according to claim 2, wherein the decimal digits $h_a'$, $h_b'$, $e_a'$, $e_b'$, and r' are $h_a'/2^n$ ($0 \leq h_a' < 2^n$), $h_b'/2^n$ ($0 \leq h_b' < 2m$), $e_a'/2^n$ ($0 \leq e_a' < 2^n$), $e_b'/2^n$ ($0 \leq e_b' < 2^n$), $r'/2^n$ ($0 \leq r' < 2^n$), respectively, and n is a natural number.

4. The information processing apparatus according to claim 3,
wherein the radix C of the high-precision computer number is 2; and
n of the decimal digits is 8.

5. The information processing apparatus according to claim 4, wherein, in addition (A+B), the processor is programmed to set the minimum extended digit satisfying the following formula (14) as the extended absolute effective digit.

$$C^{ea+ea'} + C^{eb+eb'} \leq C^{r+r'} \quad (14)$$

6. The information processing apparatus according to claim 4, wherein, in multiplication (A*B), the processor is programmed to set the minimum extended digit satisfying the following formula (15) as the extended absolute effective digit.

$$C^{hb+ea+hb'+ea'} + C^{ha+eb+ha'+eb'} + C^{ea+eb+ea'+eb'} \leq C^{r+r'} \quad (15)$$

7. The information processing apparatus according to claim 4, wherein, in division (B/A), the processor is programmed to evaluate the following formula (18) as the high-precision computer number defined by the following formulas (16) and (17) by using $h_a + h_a' - 1/256$ and $h_b + h_b' - 1/256$ instead of $h_a + h_a'$ and $h_b + h_b'$, respectively, to determine the extended absolute effective digit.

$$A = a_1 + a_2, |a_1| > C^{h_a + h_a' - \frac{1}{256}}, \quad (16)$$
$$-C^{e_a + e_a'} \leq a_2 < C^{e_a + e_a'}$$

$$B = b_1 + b_2, |b_1| > C^{h_b + h_b' - \frac{1}{256}}, \quad (17)$$
$$-C^{e_b + e_b'} \leq b_2 < C^{e_b + e_b'}$$

$$\frac{B}{A} = \frac{b_1 + b_2}{a_1 + a_2} = \frac{b_1}{a_1} + \frac{b_2 a_1 - b_1 a_2}{a_1(a_1 + a_2)} \quad (18)$$

8. The information processing apparatus according to claim 1, wherein a data structure of the high-precision computer number has a first header, a second header, and a significand,
the first header has the sign s of 1 bit and an array of 7 bit,
the second header has the high order max h of 16 bit, the high order max sub h' of 8 bit, the low order max l, the absolute effective digit e of 16 bit, and the absolute effective digit sub e' of 8 bit, and
the significand has a 32 bit array a with a maximum of 127.

9. The information processing apparatus according to claim 8, wherein a floating point representation data is converted to the data structure of a high-precision computer number.

10. A non-transitory recording medium comprising a program for causing a computer to execute a process comprising:
an input step of inputting a high-precision computer number in which real numbers A and B are respectively defined by the following formulas (11) and (12);
a storing step of storing the high-precision computer number in bit representation into a memory; and
an arithmetic step of performing an arithmetic operation by using definite numbers $a_1$ and $b_1$ of the high-precision computer numbers stored in the memory, and by assuming that real numbers A and B fall within a range of $a_1 - C^{ea+ea'} \leq A < a_1 + C^{ea+ea'}$ and $b_1 - C^{eb+eb'}$, respectively, determining an extended absolute effective digit ($\gamma + \gamma'$) so as to satisfy the following formula (13); and storing, in the memory, high-precision computer numbers as the result of the arithmetic operation, $$A = a_1 + a_2, |a_1| \leq C^{ha+ha'}, -C^{ea+ea'} \leq a_2 < C^{ea+ea'} \quad (11)$$

$$B = b_1 + b_2, |b_1| \leq C^{hb+hb'}, -C^{eb+eb'} \leq b_2 < C^{eb+eb'} \quad (12)$$

$$(A,B) = (a,b)_1 + (a,b)_2, -C^{r+r'} \leq (a,b)_2 < C^{r+r'} \quad (13)$$

wherein $a_1$ and $b_1$ are definite numbers whose numerical values are definite, and $a_2$ and $b_2$ are uncertain numbers whose numerical values are uncertain; C denotes a radix; $h_a + h_a'$ and $h_b + h_b'$ respectively denote extended high order maxes that are minimum extended digits satisfying $|a_1| \leq C^{ha+ha'}$ and $|b_1| \leq C^{hb+hb'}$; $h_a$ and $h_b$ respectively denote high order maxes that are integers; $h_a'$ and $h_b'$ respectively denote decimal digits that are decimals of $0 \leq h_a' < 1$ and $0 \leq h_b' < 1$; $e_a + e_a'$, $e_b + e_b'$, and $\gamma + \gamma'$ denote extended absolute effective digits that are extended digits; $e_a$, $e_b$, and $\gamma$ denote absolute effective digits that are integers; $e_a'$, $e_b'$, and r' respectively denote decimal digits that are decimals of $0 \leq e_a' < 1$, $0 \leq e_b' < 1$, and $0 \leq r' < 1$; (A, B) is the arithmetic operation result of the real numbers A and B; $(a, b)_1$ is the arithmetic operation result of the definite numbers $a_1$ and $b_1$; and $(a, b)_2$ is the arithmetic operation result of the uncertain numbers $a_2$ and $b_2$; and
wherein a sign s, a high order max h, a high order max sub h', a low order max l, an absolute effective digit e, an absolute effective digit sub e', and a number of array a are input, a predetermined number of bit arrays in the memory are secured based on the high order max h and a least significant digit l, and the high-precision computer number is stored in the memory in bit representation.

11. An information processing method comprising:
an input step of inputting a high-precision computer number in which real numbers A and B are respectively defined by the following formulas (11) and (12);
a storing step of storing the high-precision computer number in bit representation into a memory; and
an arithmetic step of performing an arithmetic operation by using definite numbers $a_1$ and $b_1$ of the high-precision computer numbers stored in the memory, and by assuming that real numbers A and B fall within a range of $a_1 - C^{ea+ea'} \leq A < a_1 + C^{ea+ea'}$ and $b_1 - C^{eb+eb'}$, respectively, determining an extended absolute effective digit ($\gamma + \gamma'$) so as to satisfy the following formula (13); and storing, in the memory, high-precision computer numbers as the result of the arithmetic operation, $$A = a_1 + a_2, |a_1| \le C^{h_a+h_a'}, -C^{e_a+e_a'} \le a_2 < C^{e_a+e_a'} \quad (11)$$

$$B = b_1 + b_2, |b_1| \le C^{h_b+h_b'}, -C^{e_b+e_b'} \le b_2 < C^{e_b+e_b'} \quad (12)$$

$$(A,B) = (a,b)_1 + (a,b)_2, -C^{\gamma+\gamma'} \le (a,b)_2 < C^{\gamma+\gamma'} \quad (13)$$

wherein $a_1$ and $b_1$ are definite numbers whose numerical values are definite, and $a_2$ and $b_2$ are uncertain numbers whose numerical values are uncertain; C denotes a radix; $h_a+h_a'$ and $h_b+h_b'$ respectively denote extended high order maxes that are minimum extended digits satisfying $|a_1| \le C^{h_a+h_a'}$ and $|b_1| \le C^{h_b+h_b'}$; $h_a$ and $h_b$ respectively denote high order maxes that are integers; $h_a'$ and $h_b'$ respectively denote decimal digits that are decimals of $0 \le h_a' < 1$ and $0 \le h_b' < 1$; $e_a+e_a'$, $e_b+e_b'$, and $\gamma+\gamma'$ denote extended absolute effective digits that are extended digits; $e_a$, $e_b$, and $\gamma$ denote absolute effective digits that are integers; $e_a'$, $e_b'$, and r' respectively denote decimal digits that are decimals of $0 \le e_a' < 1$, $0 \le e_b' < 1$, and $0 \le r' < 1$; (A, B) is the arithmetic operation result of the real numbers A and B; $(a, b)_1$ is the arithmetic operation result of the definite numbers $a_1$ and $b_1$; and $(a, b)_2$ is the arithmetic operation result of the uncertain numbers $a_2$ and $b_2$; and wherein a sign s, a high order max h, a high order max sub h', a low order max l, an absolute effective digit e, an absolute effective digit sub e', and a number of array a are input, a predetermined number of bit arrays in the memory are secured based on the high order max h and a least significant digit l, and the high-precision computer number is stored in the memory in bit representation.

* * * * *